US011633864B2

(12) United States Patent
Poteet et al.

(10) Patent No.: US 11,633,864 B2
(45) Date of Patent: Apr. 25, 2023

(54) POLYBAG GRIPPING SUCTION CUP

(71) Applicant: Dexterity, Inc., Redwood City, CA (US)

(72) Inventors: Austen Poteet, San Francisco, CA (US); Jeesu Baek, San Mateo, CA (US); Devon Weinberger, Mountain View, CA (US); Jordan Cedarleaf-Pavy, Mountain View, CA (US); Timothy Ryan, San Francisco, CA (US)

(73) Assignee: Dexterity, Inc., Redwood City, CA (US)

(*) Notice: Subject to any disclaimer, the term of this patent is extended or adjusted under 35 U.S.C. 154(b) by 0 days.

(21) Appl. No.: 17/716,388

(22) Filed: Apr. 8, 2022

(65) Prior Publication Data

US 2022/0339800 A1  Oct. 27, 2022

Related U.S. Application Data

(60) Provisional application No. 63/179,626, filed on Apr. 26, 2021.

(51) Int. Cl.
*B25J 5/00* (2006.01)
*B25J 9/00* (2006.01)
*B25J 15/06* (2006.01)
*B25B 11/00* (2006.01)

(52) U.S. Cl.
CPC ......... *B25J 15/0683* (2013.01); *B25B 11/005* (2013.01)

(58) Field of Classification Search
CPC .. B25J 15/0683; B25J 15/0616; B25J 15/065; B25J 15/0028; B25B 11/005

USPC .......................................... 294/183
See application file for complete search history.

(56) References Cited

U.S. PATENT DOCUMENTS 2,798,757 A * 7/1957 Jackson ................. B65B 23/08
271/103
4,712,818 A * 12/1987 Borgman ............... B65G 47/91
414/752.1
4,850,627 A    7/1989 Franklin
4,917,427 A    4/1990 Scaglia
(Continued)

FOREIGN PATENT DOCUMENTS

CN   108706140   10/2018
CN   110654866   1/2020

*Primary Examiner* — Paul T Chin
(74) *Attorney, Agent, or Firm* — Van Pelt, Yi & James LLP

(57) ABSTRACT

A vacuum cup connected to a robotic arm for picking and placing items is disclosed. The vacuum cup includes one or more walls that defines (i) a first internal cavity and (ii) an opening to the first internal cavity, wherein the first internal cavity is defined at least in part by an interior surface adjacent to the opening to the first internal cavity, the interior surface defining an internal ridge positioned to mechanically engage a material drawn into the first internal cavity through the opening at an angle such that the mechanical engagement resists the material being removed from the first internal cavity via the opening. In response to the item being engaged and the suction system controlling the pressure within the first internal cavity to create a vacuum seal between the vacuum cup and the item, at least part of the item is caused to enter the first internal cavity at least during engagement of the vacuum seal.

25 Claims, 16 Drawing Sheets

(56) References Cited

U.S. PATENT DOCUMENTS

| | | | |
|---|---|---|---|
| 5,190,332 A | 3/1993 | Nagai | |
| 7,000,964 B1 * | 2/2006 | Porras | B65G 47/917 |
| | | | 294/186 |
| 7,828,351 B2 * | 11/2010 | Baumstimler | B65G 47/91 |
| | | | 198/468.4 |
| 8,251,415 B2 * | 8/2012 | Lomerson, Jr. | B25J 15/0616 |
| | | | 294/2 |
| 10,906,188 B1 * | 2/2021 | Sun | B65G 47/917 |
| 11,241,802 B2 * | 2/2022 | Douglas | B25J 15/0691 |
| 11,351,678 B1 * | 6/2022 | Polido | B25J 9/1612 |
| 2007/0130884 A1 | 6/2007 | Verhoeven | |
| 2020/0048014 A1 | 2/2020 | Nakayama | |
| 2020/0262087 A1 * | 8/2020 | Douglas | B25J 15/0057 |
| 2020/0269443 A1 * | 8/2020 | Billon | B65G 47/91 |
| 2021/0402618 A1 * | 12/2021 | Wagner | B25J 9/10 |
| 2022/0203549 A1 * | 6/2022 | Karako | G01B 11/16 |

* cited by examiner

POLYBAG GRIPPING SUCTION CUP

CROSS REFERENCE TO OTHER APPLICATIONS

This application claims priority to U.S. Provisional Patent Application No. 63/179,626 entitled POLYBAG GRIPPING SUCTION CUP filed Apr. 26, 2021 which is incorporated herein by reference for all purposes.

BACKGROUND OF THE INVENTION

Robots have been used to perform tasks in manufacturing and other fields. For example, robots have been used to perform tasks in environments that may be unhealthy or otherwise dangerous to humans, tasks that require the application of force greater than a human may be able to apply, and tasks that require a high degree of precision and consistency over time.

Autonomous robots perform at least some tasks in an automated manner, without requiring human control or direction. For example, automated robots have been used to perform repetitive and/or otherwise predetermined tasks and sequences of tasks, typically in a controlled environment, such as a factory. More recently, self-driving cars, delivery drones, and other autonomous vehicles have been under development.

Kitting, singulation, and palletization related processes are traditionally very labor intensive processes for which the adoption of robotics is challenging because of the mobility restrictions and the difficulty of providing and programming a robot to perform tasks such as reaching into a bin or shelf, picking up items of arbitrary size, fragility, consistency, etc., or to perform such tasks as sorting an arbitrary mix of items. As a result, large scale kitting, singulation, and/or palletization operations have continued to be human labor intensive.

Another challenge with the use of robotics in connection with kitting, singulation, and/or palletization related process is the design and selection of end effectors. The end effector of a robotic arm is the module with which the robotic arm may engage with an item in a source pile/flow. Different types of end effectors may be better optimized for certain sizes, packaging types, weights, shapes, etc. Further, end effectors comprising a suction cup have difficulty grasping and/or gripping items having loosely filled packaging, thereby impeding the ability of the robotic arm to pick up and place items in corresponding destination locations.

BRIEF DESCRIPTION OF THE DRAWINGS

Various embodiments of the invention are disclosed in the following detailed description and the accompanying drawings.

DETAILED DESCRIPTION

Figure 1:
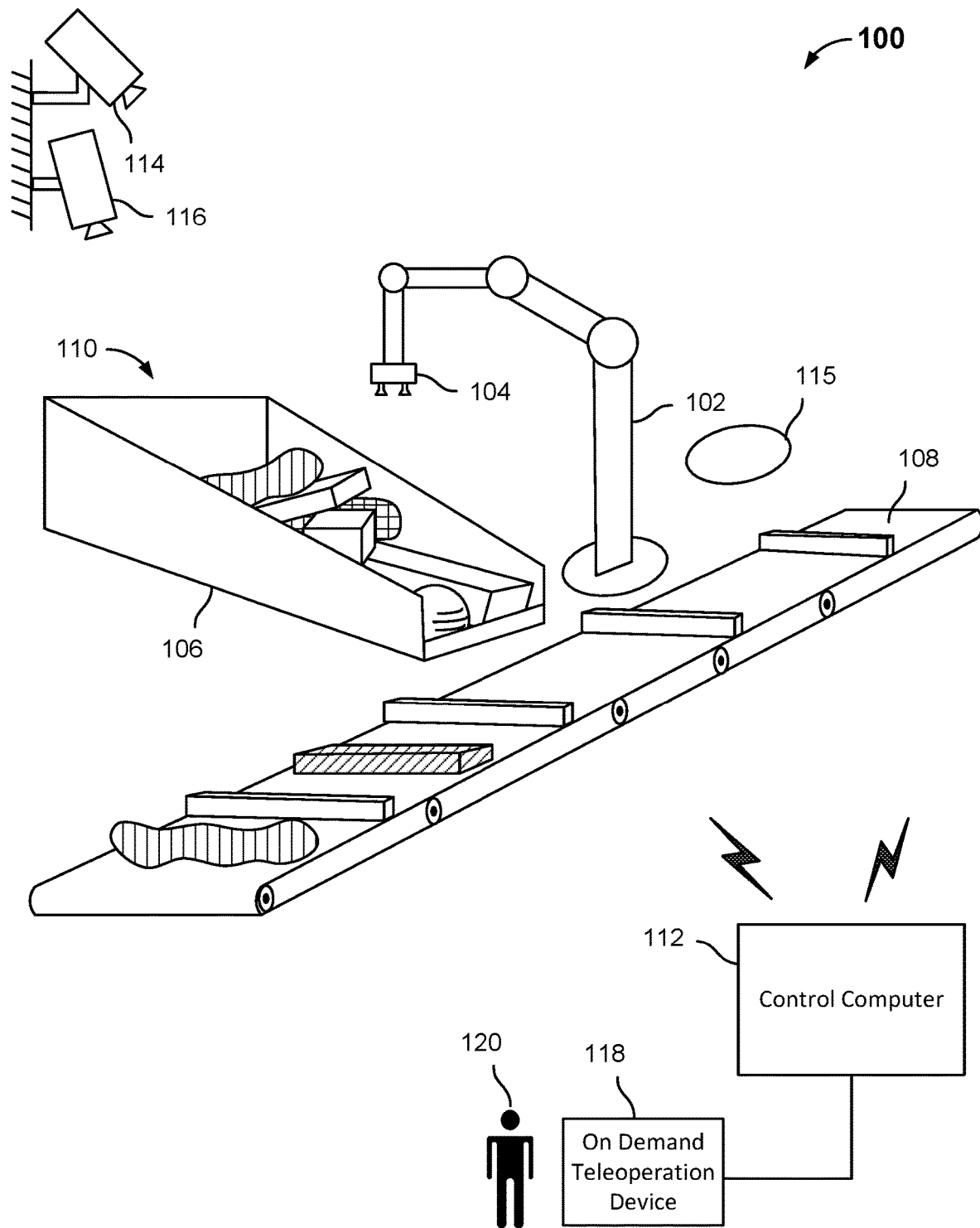
FIG. 1 is a diagram illustrating a singulation system according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, kitting includes the picking of one or more items/objects from corresponding locations and placing the one or more items in a predetermined location in a manner that a set of the one or more items correspond to a kit.

As used herein, singulation includes the picking of one or more items/objects from a source pile or flow, and singly placing the one or more items in corresponding predetermined locations such as locations on a segmented conveyor (e.g., within trays on a conveyor) or similar conveyance to be sorted and routed for transport to a downstream (e.g., ultimate addressed/physical) destination.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

As used herein, an identifier includes a label, a bar code, a symbol, an image, an alphanumeric string, a code, or the like. The identifier may be printed on a label affixed to an item, included on a side of an item, embedded on a radio-frequency identification (RFID) tag attached to an item, etc. In some embodiments, the identifier comprises machine readable information, such as text and/or optically or otherwise encoded information, which can be machine read and used in connection with kitting or singulating the object and/or item, e.g., via an automated kitting system and/or processing, and/or an automated singulation system and/or processing.

One technical challenge to using robotic systems in connection with picking and placing items (e.g., using robotic singulation systems, robotic kitting systems, and/or robotic palletization systems) is the particular manner and type of packaging of an item. As an example, in the case of items having loose packaging such as polybags (e.g., loose and non-rigid packaging), robotic arms having end effectors comprising suction-based grippers are challenged with securely gripping such items. Loosely filled polybags of various filling, shapes, and sizes present particular challenges to robotic arms having such end effectors. Suction-based grippers generally include suction cups that do not form an adequate seal (e.g., vacuum seal) with the items thereby making grasping/gripping items packaged in polybags difficult. For example, related art suction-cups are generally made of silicone.

A vacuum cup(s) that securely grasps/grips loosely packaged items is disclosed. According to various embodiments, robotic arms having end effectors equipped with the vacuum cup are able to handle items having a variety of bag materials, a variety of bag filings (e.g., soft, rigid, heavy, light, evenly distributed mass, non-evenly distributed mass, etc.). The vacuum cup and/or the robotic arms equipped with the vacuum cup are compatible with various packaging types (e.g., boxes, polybags, rigid plastic, etc.). According to various embodiments, the vacuum cup and/or the robotic arms equipped with the vacuum cup are able to move items at relatively high-speeds, and the vacuum cup is configured to securely grip (e.g., form a secure vacuum seal with) an item such that the moving the item using the vacuum cup as a gripper is able to withstand dynamic forces that arise during high-speed manipulation of items (e.g. dynamic forces at the interface between the vacuum cup and the item).

A vacuum cup comprising an internal shape to grab soft bag materials (e.g., polybags, items loosely packaged with polybags, etc.) is disclosed. According to various embodiments, the internal shape of the vacuum cup provides (or can cause) a secure vacuum seal (e.g., a maximum or optimal seal) between the vacuum cup and the item. The internal shape of the vacuum cup may provide a greater surface area with which the vacuum cup contacts (e.g., grips) an item relative to a suction cup according to the related art. The greater surface area may provide a relative increase in holding force acting on an item. For example, greater friction forces may be provided or caused by the interface between the surfaces of the vacuum cup and at least part of the item (e.g., a part of the packaging of the item such as part of a polybag packaging). The internal shape of the vacuum cup may also provide surfaces with which at least part of the item interfaces such that frictional forces between the at least the part of the item and the internal surface(s) are formed in advantageous directions. For example, the advantageous directions may correspond to directions that impede slippage of the item from the grip of the vacuum cup (e.g., directions that are opposite of gravity, or that are perpendicular to gravity and in a direction opposite an opening of vacuum cup). The opening of the vacuum cup may be an opening to an internal cavity of the vacuum cup, such as a first or primary internal cavity of the vacuum cup. When the vacuum cup is engaged with an item and a suction force is applied (e.g., via a suction system) such as by controlling a pressure of fluid within the internal shape (e.g., the primary internal cavity and/or one or more secondary internal cavities), in the case of the item being loosely packaged such as in a non-rigid material (e.g., a polybag), at least a part of the packaging and/or item may enter the internal shape. If at least a part of the packaging/item enters the internal shape, various frictional forces may act on the part of the packaging/item thereby impeding or restricting the slippage of the item from grip of the vacuum cup (e.g., the grasping of item with the vacuum cup may be relatively more resilient to dynamic forces generated during movement of the item to a destination location). As an example, if at least a part of the packaging/item enters the internal shape, the packaging around the part of the item outside the opening of the vacuum cup is relatively tighter, which may reduce sway of the item during movement of the item to the destination location.

According to various embodiments, the internal shape is defined by one or more walls of the vacuum cup (e.g., one or more interior walls of the vacuum cup). The one or more walls may define an internal cavity (e.g., corresponding to the internal shape of the vacuum cup). The one or more walls may define an opening to the internal cavity (e.g., a first internal cavity, which is also referred to herein as a primary internal cavity). In some embodiments, the vacuum cup comprises one or more walls that define at least one secondary internal cavity. A secondary internal cavity may correspond to a cavity or internal shape having an opening from the first internal cavity (e.g., the primary internal cavity). For example, a secondary internal cavity is a cavity that branches from the first internal cavity. In some embodiments, a secondary internal cavity is smaller than the first internal cavity. For example, a secondary internal cavity has a smaller volume and/or the internal surface(s) area of the secondary internal cavity is smaller than the volume and/or internal surface area of the first internal cavity. In some embodiments, a vacuum cup comprises a plurality of secondary internal cavities.

According to various embodiments, a vacuum cup has a relatively large opening to an internal cavity, such as primary internal cavity. The opening to the primary internal cavity (e.g., from an exterior of the vacuum cup) may be at least 2 cm long from one side of the opening to an opposing side of the opening (e.g., a diameter in the case of a circular opening). In some implementations, the opening is at least 5 cm long from one side of the opening to an opposing side of the opening. In some implementations, the opening is at least 8 cm long from one side of the opening to an opposing side of the opening. The opening to the primary internal cavity may be between 2 cm and 15 cm from one side of the opening to an opposing side of the opening. In some implementations, the opening to the primary internal cavity may be between 3 cm and 10 cm from one side of the opening to an opposing side of the opening. In some implementations, the opening to the primary internal cavity may be between 4 cm and 8 cm from one side of the opening to an opposing side of the opening. In some embodiments, a length or width from one internal side surface to an opposing internal side surface of the internal cavity is greater than a distance from one side of the opening to an opposing side of the opening.

A relatively larger opening may result in a greater suction force than a smaller opening. For example, in the case of a circular vacuum cup, increasing a cup diameter may directly increase a suction force applied to a particular item being grasped. The suction force may be represented as $F=P \times A$, where P is the pressure and A is the area (e.g., over which the pressure acting). Accordingly, as the opening is increased, the suction force applied to the item (e.g., assuming the pressure remains constant) is correspondingly increased. However, if the item is non-rigid or is packaged in a wrinkly material such as a polybag, increasing the size of the opening to the vacuum makes forming a vacuum seal between the vacuum cup and the item challenging. According to various embodiments, the vacuum cup disclosed herein mitigates some of the challenges associated with handling items that are non-rigid or packaged in a polybag (e.g., a loosely filled polybag).

According to various embodiments, a vacuum cup comprising a relatively larger internal cavity (e.g., primary internal cavity) is provided. The vacuum cup may comprise one or more internal ridges. As an example, the vacuum cup includes one or more ridges in the primary internal cavity and/or one or more secondary internal cavities. In some embodiments, the internal ridges are formed via a profile of one or more walls that define the primary internal cavity and/or secondary internal cavity. One or more internal ridges within an internal cavity can increase a surface area of an internal surface of the internal cavity, and a total frictional force applied to the item (e.g., the part of the packaging and/or item that enters the internal cavity when a vacuum seal is created). The one or more ridges may serve to resist shearing forces with respect to the item (e.g., particularly shearing forces that act in a manner/direction that is opposed to the grasping of the item via the vacuum cup, etc.). For example, if the packaging and/or item within the internal cavity wraps around/engages one or more ridges within the internal cavity, forces applied to the item in both the downward and lateral directions (e.g., forces acting to remove the item from the grasp of the vacuum cup) will generally have to overcome a much greater frictional force to unseat the item and release the vacuum seal. Accordingly, a vacuum cup according to various embodiments may be implemented in connection with handling heavier items (e.g., items packaged in bags such as polybags) at higher speeds as compared to suction cups according to related art (e.g., suction cups that do not have internal ridges, etc.).

According to various embodiments, a vacuum cup comprises a smooth surface or edge at the entry to the internal cavity (e.g., an entry from the exterior of the vacuum cup to the primary internal cavity, and/or an entry from the primary internal cavity to a secondary internal cavity). The smooth surface or edges at the entry to the internal cavity promotes entry of part of the packaging and/or item to the internal cavity. The smooth surface or edges at the entry to the internal cavity may improve the vacuum seal (e.g., because part of the packaging/item enters the internal cavity and/or the packaging/item conforms to the contours of the vacuum cup such as at the interface between the vacuum cup and the item).

According to various embodiments, a vacuum cup comprises one or more pinching flaps or other mechanisms (e.g., flexible flaps, etc.) that permit entry of a part of packaging or item to the internal cavity but that restrict or impede remove of the part of packaging or item from the internal cavity. The pinching flaps and/or ridges or other sources of friction between the vacuum cup and the packaging/item may use the same principles of applying frictional forces to inhibit movement (e.g., releasing the item from the grasp of the vacuum cup) as used in friction rope braking applications.

According to various embodiments, a vacuum cup comprises a depth limiter. In some embodiments, the depth limiter is configured to adjust according to a packaging or item being grasped. For example, the depth limiter is configured to adjust a depth of the internal cavity (e.g., the primary internal cavity) based at least in part on a type of packaging (e.g., bag) of an item. As an example, limiting a depth to which a part of packaging and/or item enters the internal cavity limits or prevents damage to the items or the packaging of items. As another example, limiting a depth to which a part of packaging and/or item enters the internal cavity improves/ensures that a smooth release of the item (e.g., in response to suction in the internal cavity being moderated or removed, etc.). In some embodiments, the depth limiter is a meshed material.

According to various embodiments, the vacuum cups are made of (or comprise walls made of) relatively harder or more rigid materials. As an example, related art suction-cups are generally made of silicone, polyurethane, or nitrile rubber. In some embodiments, the vacuum cups are made of (or comprise walls made of) a nylon-based plastic. The material used in connection with the vacuum cups (e.g., the walls or lips of the vacuum cup) may be selected based at least in part on a hardness and/or a friction of the material. In various embodiments, an upper body of the vacuum cup is made of a relatively more compliant material (e.g., less rigid), and the lower body (e.g., a part of the vacuum cup comprising an entry to the vacuum cup via which an item is pulled into the vacuum cup) of the vacuum cup is made of a less compliant material (e.g., more rigid, hard, etc.). The more compliant materials of the upper body provide some overall compliance of the vacuum cup when contacting the item. Less compliant materials of the lower body of the vacuum cup ensure that the lip (e.g., a wall at the entry of the interior cavity) is resistant to deformation as the vacuum cup engages the item or releases the item. For example, the material for the lower body is selected to ensure that the lip does not deform as the vacuum cup is being used to pick and place items.

An end effector or vacuum cup as disclosed herein may be used in connection with a robotic singulation system, as in U.S. patent application Ser. No. 16/916,601, issued on Mar. 23, 2021 as U.S. Pat. No. 10,954,081, U.S. patent application Ser. No. 17/202,040 filed on Mar. 15, 2021, and U.S. patent application Ser. No. 17/246,356 filed on Apr. 30, 2021, all of which are hereby incorporated in their entireties for all purposes.

An end effector or vacuum cup as disclosed herein may be used in connection with a robotic kitting system, as in U.S. patent application Ser. No. 17/219,503 filed on Mach 31, 2021, and U.S. patent application Ser. No. 17/246,356 filed on Apr. 30, 2021, both of which are hereby incorporated in their entireties for all purposes.

An end effector or vacuum cup as disclosed herein may be used in connection with a robotic palletization system, as in U.S. patent application Ser. No. 17/343,606 filed on Jun. 9, 2021, and U.S. patent application Ser. No. 17/343,609 filed on Jun. 9, 2021, both of which are hereby incorporated in its entirety for all purposes.

FIG. 1 is a diagram illustrating a singulation system according to various embodiments.

In the example shown, system 100 includes a robotic arm 102 equipped with a suction-based end effector (e.g., end effector 104). According to various embodiments the suction-based end effector (e.g., end effector 104) comprises one or more vacuum cups such as vacuum cup 800 of FIG. 8A, vacuum cup 850 of FIG. 8B, vacuum cup 900 of FIG. 9, and/or vacuum cup 1010 of FIG. 10. While in the example shown the end effector 104 is a suction-based end effector, in various embodiments one or more other types of end effector may be used in a singulation system as disclosed herein, including without limitation a pinch-based end effector or other types of actuated grippers. In some embodiments, end effector 104 comprises one or more suction-based ends (e.g., one or more suction cups). In various embodiments, the end effector may be actuated by one or more of suction, air pressure, pneumatics, hydraulics, or other actuation. Robotic arm 102 and end effector 104 are configured to be used to retrieve parcels or other items that arrive via chute 106 (or bin) and place each item in a corresponding location on segmented conveyor 108 (e.g., a destination location). In this example, items are fed into chute 106 from an intake end of workspace 110. For example, one or more human and/or robotic workers may feed items into intake end of workspace 110 of chute 106, either directly or via a conveyor or other electro-mechanical structure configured to feed items into chute 106.

In the example shown, one or more of robotic arm 102, end effector 104, and conveyor 108 are operated in coordination by control computer 112. In some implementations, control computer 112 is configured to control a plurality of robotic arms operating at one or more work stations. In various embodiments, a robotic singulation as disclosed herein may include one or more sensors from which an environment of the workspace is modeled. In the example shown in FIG. 1, system 100 includes image sensors, including in this example 3D cameras (e.g., cameras 114 and 116). In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 112 includes a workspace environment state system such as vision system used to discern individual items, debris on the workspace, and each item's orientation based on sensor data such as image data provided by image sensors, including in this example 3D (e.g., cameras 114 and 116). The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace. The information pertaining to output from one of the sensor arrays may include information that may indicate one or more sides of the item comprising an identifier (e.g., a label, etc.).

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 108. In some embodiments, the workspace environment state system produces an output (e.g., sensor data or information otherwise characterizing the workspace and/or items within the workspace) used by the robotic system to detect a state, condition, and/or attribute associated with one or more items in the workspace, and/or a state or condition associated with the robotic arm or other element of the workspace. According to various embodiments, in response to detecting (e.g., determining) the state, condition, and/or attribute associated with one or more items in the workspace, the robotic system implements one or more active measures in connection with singulating an item. As an example, the active measure may include updating the plan to autonomously operate a robotic structure to pick one or more items from the workspace and place each item singly in a corresponding location in a singulation conveyance structure. As an example, the active measure may include updating the plan to include an updated path or trajectory of the item so that the item is moved within a threshold range of one or more sensors in the workspace (e.g., within a line of sight of one or more sensors to allow the one or more sensors to obtain information from an identifier on the item). In some embodiments, the active measure or the updating the plan can include operating the robotic structure to change or adapt to the detected state, condition, and/or attribute (e.g., implement a change of a manner by which an item is singulated, change a path or trajectory along which the item is singulated, change a manner by which the item is grasped, change a location on the item at which the item is grasped, etc.).

In various embodiments, a robotic system as disclosed herein includes and/or does one or more of the following, e.g., by operation of a control computer such as control computer 112:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system determines characteristics of items and/or debris or other abnormalities in the tree-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system coordinates operation of a plurality of robots operating within a same workspace to singulate a plurality of items. For example, in various embodiments, the plurality of robots operate independently to pick and place items. If a risk of collision is detected, responsive action is taken to ensure the plurality of robots do not collide with one another during singulation.

Robotic system coordinates operation of multiple robots to ensure all items are placed and only one per slot/location. For example, if robot A drops an item system tasks robot B to pick it up; item placed but with improper orientation is picked up and adjusted or moved to another location by same or another robot; two or more items in a single destination slot results in robot downstream station picking one of the two or more items off the conveyor and placing the item in a new location; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Conveyor movement and/or speed controlled as needed to avoid empty locations and achieve a desired robot productivity (throughput).

In response to a determination that an item is misplaced or dropped, the system assigns a robot or, if needed, a human worker to pick it up and place back in the retrieving robot's own source pile or, if available or more optimal, on a next open slot on the conveyor.

Upstream robots controlled to intentionally leave some slots open for downstream robots to place items on the conveyor.

Downstream robots controlled to correct errors from an upstream placing an item on the conveyor (e.g., to correct the placement of an item that rests in more than one slot/tray, to update a data structure with an association between an identifier for the item with the slot in which the upstream robot placed the item, etc.).

Downstream sensors may be controlled (or information from such sensors may be obtained) to obtain information pertaining to one or more identifiers on an item being carried on the conveyor.

A failure or error that cannot be corrected by same or another robot results in alert to obtain human (or other robotic) intervention to resolve.

Move/remove the debris within the workspace, or to reconfigure an item to be singulated (e.g., to improve the likelihood that the item is successfully picked from the source pile/flow and placed on the conveyance structure).

Control a chute conveyor to reconfigure items within the workspace (e.g., to bring an item selected for singulation closer to a front of the chute for quicker and easier access by the robotic arm, to reposition one or more items to improve the ability of a robotic arm to grasp an item, etc.).

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics (e.g., attributes) of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Select a path for singulating an item on the conveyance structure based on an attribute of the item (e.g., a size of the selected item, a weight of the item, etc.) and/or one or more attributes (e.g., characteristics) of an item within a slot on the conveyance structure. For example, a path is determined to place the item on the place in a slot that is adjacent to a slot comprising a tall or large item. As another example, the path for singulating the item may be determined based on a location of an identifier on an item (e.g., a location of the identifier relative to a sensor or scanner in the workspace).

Determine a movement and speed of the robotic arm that singulates an item based at least in part on a speed of a conveyor belt.

Determine a trajectory of the item to be singulated based at least in part on one or more of a characteristic of the item (e.g., a location of an identifier on the item), a characteristic of the workspace environment, a location of a sensor or scanner, and/or a characteristic of the conveyance structure (e.g., a speed of the conveyor belt).

Determine a probability of successful singulation corresponding to one or more paths/trajectories of an item to be singulated, and select a path/trajectory along which the item is to be singulated based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector be orthogonal to a surface of the item.

Update the ability of the robotic system to detect an empty slot or tray. For example, the definition of an empty slot/tray used by the robotic system to identify an empty slot/tray is updated over time.

In various embodiments, an arbitrary mix of items to be singulated may include parcels, packages, and/or letters of a variety of shapes and sizes. Some items may be standard packages one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors, or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal. According to various embodiments, in response to determining that the item is relatively heavy (e.g., that the weight exceeds a predefined threshold) and that the item is packaged in a poly-bag, or in response to determining that tenting is being caused while gasping the item, the robotic structure performs an active measure to change or adapt to the "tenting" or to the determination that the packaging of the item. As an example, the robotic structure performs an active measure to partially lift the package and drag the package from the chute to the corresponding slot in the conveyance structure.

The robotic system may determine a path or trajectory (or a trajectory of the robotic arm/end effector in approaching the item for grasp) based on a type of packaging of the item in order to avoid tenting or to otherwise improve a grasping of the item. As an example, the robotic arm (e.g., a wrist) and/or the end effector is controlled to be orthogonal to a surface of the item from which the item is grasped. As another example, the path or trajectory of the robotic arm and/or end effector can be determined to knock an item over or otherwise reposition the item before grasping the item.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc. In some embodiments, the image data is used to determine a characteristic (e.g., an attribute) of one or more items in the workspace. As an example, the image data can be used in connection with determining (e.g., estimate) a height or dimension of an item. As another example, the image data can be used to obtain information pertaining to an identifier (e.g., a label, etc.) on the item. The image data may be used to determine a side of the item on which the label is comprised.

The multiple cameras serve many purposes, in various embodiments. First, they provide a richer full 3D view into the scene. Next, they operate in cohesion to minimize the errors due to package shininess when light reflecting off a package and into a camera may disrupt its operation; in this case another camera at a different location provides a backup. In some embodiments, they can be selectively triggered by a predictive vision algorithm that determines which camera has the best viewing angle and/or lowest error rate for picking a particular package; as such each package has the optimal camera looking at it. In some embodiments, one or more cameras are mounted on an actuated base, of which the system can change the position and orientation to provide a more optimal perception (e.g., view) of a package. In embodiments, one or more cameras are mounted on the robotic structure (e.g., on the end effector of the robotic arm, etc.).

Another purpose served by cameras (e.g., camera 114 and/or camera 116) is, in various embodiments, to detect any sort of unforeseen error in robot operation or any disruption to the environment. Cameras placed on the robot and on the environment have different error and accuracy profiles. The cameras on the robot can be more accurate since they are rigidly fixed to the robot but slower to use because use of such cameras require the robot to slow down or stall. Cameras in the environment have a stable view and are effectively faster because the robot can multi-task and do something else while a camera is taking a photo. But if someone moves or shakes the camera stand, the cameras may become out of sync with the robot and cause errors. In various embodiments, images from robot and non-robot cameras are combined (e.g., occasionally or on a package miss), to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some embodiments gyros and/or accelerometers on the cameras may be used to filter or compensate for the motion of the mounting base.

According to various embodiments, system 100 may include one or more sensors other than or in addition to a plurality of cameras, such as one or more of an infrared sensor array, a laser array, a scale, a gyroscope, a current sensor, a voltage sensor, a power sensor, and the like. Information received from the various other sensors is used in determining one or more attributes of the item to be singulated and/or attributes of another item or object within the workspace, etc.

Referring to FIG. 1, in various embodiments, robotic arm 102 is be driven by one or more motors, e.g., one or more motors at each movable joint or mount location. In some embodiments, the work required to drive to robotic arm 102 (e.g., to move the robotic arm as the robotic arm attempts to singulate an item) is indicative of one or more characteristics of the item to be singulated. For example, in some embodiments, a weight of the item may be computed (or estimated) based on the work required to drive the robotic arm 102 while the item is in its grasp. In various embodiments, the work required to drive the robotic arm 102 is measured using a current sensor, a voltage sensor, a power sensor, and/or the like, or some combination thereof. In response to determining the weight of the item during singulation, the robotic system determines a path/trajectory of an item to be singulated based at least in part on the weight of the item. The robotic system may perform an active measure to adapt to the weight of the item such as, for example, updating the path or trajectory in response to determining the weight of the item. In some embodiments, in response to determining that the weight of the item is greater than a predefined threshold, system 100 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, the robotic structure adjusts the speed at which the robotic arm (and the item) is moved. For example, the larger the weight of the item, the greater the shear forces between the item and end effector 104 as the robotic arm 102 is moved. Further, the shear forces can increase as the speed at which the robotic arm is operated (e.g., the speed at which the robotic arm moves the item). Accordingly, system 100 can control the speed of the robotic arm 102 based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm 102 or the end effector 104. However, force sensors are relatively expensive and thus low-level hardware information, such as motor torque or a measure of the work used by the motor is an effective manner by which to determine (e.g., estimate) the weight of the item.

Information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace. The information received from the one or more sensor arrays may be used in connection with determining a height of the item to be singulated and/or another item or other object within the workspace. In some embodiments, the robotic system determines a path or trajectory (or updates the path or trajectory) based at least in part on height of the item to be singulated and/or another item or other object within the workspace. For example, the robotic system determines a location on the conveyor at which the item is to be placed based at least in part on a height (or other dimension) of one or more other items on the conveyor. Planning to place an item in a slot/tray adjacent to another slot/tray comprising a relatively large (e.g., tall, wide, etc.) item can increase the likelihood of a collision during singulation. In addition, a relatively large item on the conveyor can impede the ability of the robotic system to obtain information for adjacent items. The line of sight of the vision system may be blocked by a relatively large item and thus the sensor data may not include accurate information for adjacent items (or other items within close proximity to the large item). As another example, if the item includes an identifier or label on a side facing a relatively large item, or on a surface close to the large item, the vision system may be unable to locate or read the identifier or label.

Referring further to FIG. 1, in the example shown system 100 further includes an on-demand teleoperation device 118 usable by a human operator 120 to operate one or more of robotic arm 102, end effector 104, and conveyor 108 by teleoperation. In some embodiments, control computer 112 is configured to attempt to move items from the source pile (e.g., the source location) to conveyor 108 (e.g., the destination location) in a fully automated mode. As an example, the control computer 112 is configured to operate robotic arm 102 to pick up the item from the source pile and to move the item in a manner (e.g., along a path/trajectory) that one or more identifiers on the item, or information pertaining to the one or more identifiers, are obtained (e.g., scanned) by one or more sensors within the workspace. However, if after attempting to operate in fully automated mode control computer 112 determines it has no (further) strategies available to have at least one of the identifiers (or information pertaining thereto) obtained by the one or more sensors, in various embodiments control computer 112 sends an alert to obtain assistance from a human operator via teleoperation, e.g., by human operator 120 using teleoperation device 118. Teleoperation device 118 may display one or more images on a user interface, the one or more images corresponding to images of the item, or the workspace captured by the vision system (e.g., camera 114, camera 116, one or more other sensors, etc.). The user interface may be configured to allow a human operator 120 to manually input information pertaining to an identifier on the image (e.g., information that is visible in the one or more images), and/or information pertaining to the item.

In some embodiments, control computer 112 is configured to attempt to grasp and place items in a fully automated mode. However, if after attempting to operate in fully automated mode control computer 112 determines it has no (further) strategies available to grasp one or more items, in various embodiments control computer 112 sends an alert to obtain assistance from a human operator via teleoperation, e.g., by human operator 120 using teleoperation device 118. For example, in some embodiments, in response to detecting a state or condition affecting item flow through chute 106, control computer 112 may attempt to perform one or more actions to facilitate singulation. If fully automated attempts to response to the detected state or condition are determined not to have resolved the state or condition, control computer may prompt human operator 120 to address the state or condition, e.g., via teleoperation using on-demand teleoperation device 118. In various embodiments, control computer 112 may display a user interface or other interface that identifies the state or condition and/or presents human selectable options to control the robotic arm 102, end effector 104, and/or other elements and instrumentalities as disclosed herein (e.g., blowers, shakers, chute conveyors, etc.) to alter the state or condition.

In various embodiments, control computer 112 uses image data from cameras such as cameras 114 and 116 to provide a visual display of the scene to human operator 120 to facilitate teleoperation. For example, control computer 112 may display a view of the pile of items in chute 106. In some embodiments, segmentation processing is performed by control computer 112 on image data generated by cameras 114 and 116 to discern item/object boundaries. Masking techniques may be used to highlight individual items, e.g., using different colors. The operator 120 may use the visual display of the scene to identify the item(s) to be grasped and use teleoperation device 118 to control the robotic arm 102 and end effector 104 to pick the item(s) from chute 106 and place each in a corresponding location on conveyor 108. In various embodiments, once the item(s) for which human intervention was prompted have been placed on the conveyor, system 100 resume fully automated operation. In various embodiments, in the event of human intervention, the robotic system observes the human worker (e.g., manual task completion, task completion using a robotic arm and end effector via teleoperation) and attempts to learn a strategy to (better) complete the task in an autonomous mode in future. For example, system 100 may learn a strategy to grasp an item, e.g., by observing the places on the item at which a human worker grasps the item and/or by remembering how the human worker used the robotic arm and end effector to grasp the item via teleoperation.

In some embodiments, system 100 invokes assistance from human operator 120 in response to determining that an abnormality in the operation of system 100 exists. An example of an abnormality is a lack of a threshold pressure being attained between end effector 104 and the item during singulation of the item. In response to detecting that the pressure attained between end effector 104 and the item is less than a threshold pressure value, system 100 can perform a diagnostics process in connection with assessing whether system 100 is performing normally. For example, system 100 can perform a diagnostic of the ability of end effector 104 to engage an item and attain a predetermined threshold pressure value. In response to determining that system 100 is not performing normally (e.g., that the end effector 104 is not able to engage an item and attain a predetermined threshold pressure value), system 100 invokes assistance from human operator 120. In some embodiments, control computer 112 sends an alert to human operator 120. The alert can indicate the basis of the problem (e.g., an indication that the end effector is unable to engage the item and attain a predetermined threshold pressure value). For example, the alert can provide a recommended or requested remedial action to human operator 120.

According to various embodiments, in response to determining that current operation of system 100 deviates from expected normal operation of system 100, system 100 determines to perform a diagnostic on system 100. System 100 can perform the diagnostic on a part of the system 100 that system 100 determines, based at least in part on sensor data (e.g., the current sensor data), is deviating from normal operation or that is within a threshold range or percentage of being in deviation from normal operation. In the case of the measurement of pressure attained by end effector 104 described above, system 100 can determine the particular end effector(s) for which a diagnostic process is to be performed. In some embodiments, in response to performing the diagnostic process and determining a result of the diagnostic process indicates that system 100 (or a component thereof) is deviating from normal operation or is otherwise within the threshold range or percentage of being in deviation from normal operation, system 100 implements one or more active measures. Examples of the active measures include replacing the component (e.g., switching an end effector), determining to operate the system 100 in a manner that does not use the component in deviation of normal operation or that does not place a strain on the component in excess of a predefined strain threshold, and/or invoking human intervention (e.g., notifying human operator 120 of the deviation). Various other active measures can be implemented.

Continuing with the example described above in connection with FIG. 1, system 100 determines to perform a diagnostic process at least partly in response to system 100 determining that system 100 is deviating from normal operation or that the diagnostic process is to be performed in connection with assessing whether a remedial active measure is to be implemented. In response to determining that the pressure attained by end effector 104 while the robotic arm has picked up an item deviates from an expected normal operation of end effector 104, system 100 determines to perform a diagnostic with respect to operation of the end effector (e.g., one or more suction cups on the end effector) that is determined to deviate from normal operation. According to various embodiments, the diagnostic process for performing a diagnostic with respect to an end effector includes operating robotic arm 102 to move to a predetermined location and engage the end effector with a predetermined surface such as, in this example, surface 115. Surface 115 may be located within workspace 110. In some embodiments, surface 115 is a part of chute 106 or is operatively connected to chute 106 or conveyor 108. When the end effector is engaged to the predetermined surface, system 100 controls the end effector to grasp the predetermined surface. In response to controlling the end effector to grasp the predetermined surface, system 100 obtains sensor data pertaining to a measurement of a grasp strength with which the end effector grasps the predetermined surface. For example, in response to engaging the end effector with surface 115, system 100 controls the end effector to apply a suction to surface 115. System 100 obtains sensor data including one or more values of the pressure attained between the end effector and surface 115. System 100 then determines whether the pressure attained by the end effector in connection grasping surface 115 deviates from an expected normal operation of grasping surface 115. In some embodiments, system 100 compares the sensor data including one or more values of the pressure attained between the end effector and surface 115 with one or more predetermined ranges or threshold values mapped to a normal operation of the end effector. If the pressure attained between the end effector and surface 115 is inconsistent with normal operation of the end effector (e.g., if one or more values of the pressure attained between the end effector and surface 115 falls outside one or more predetermined ranges or threshold values mapped to a normal operation of the end effector), system 100 determines that the end effector is not working properly (e.g., the end effector is deviating from normal operation).

According to various embodiments, in response to system 100 determining that the end effector is not working properly, system 100 updates the plan to implement one or more active measures based at least in part on such determination that the end effector is not working properly. Such an active measure includes alerting human operator 120 that the end effector is not working. For example, system 100 sends a notification to the human operator 120 of the deviation from normal operation. In some embodiments, system 100 provides human operator 120 with one or more recommended active measures. In response to receiving the notification of the deviation from normal operation, the human operator 120 can implement a human intervention to replace or repair the applicable end effector. In some embodiments, human operator 120 controls system 100 using on demand teleoperation device 118 to implement an active measure such as controlling the robotic arm 102 to replace the applicable end effector. In some embodiments, human operator 120 can select at least one of the one or more recommended active measures, and in response to such selection, system 100 controls robotic arm 102 to implement the selected active measure (e.g., without additional human intervention).

In various embodiments, control computer 112 operates robotic arm 102 (or a system associated therewith) to actuate a suction cup on the end effector 104. The end effector 104 may include a plurality of suction cups and the plurality of suction cups may be actuated independently (e.g., independently of another suction cup). For example, the control computer 112 may select one or more suction cups (of a plurality of suction cups on the end effector) to actuate, and may send a signal to the end effector 104 (or the robotic arm or system associated therewith) to actuate the selected one or more suction cups. In some embodiments, the plurality of suction cups includes a plurality of sets of one or more suction cups. A set of one or more suction cups may be actuated independent from another set of one or more suction cups. In some embodiments, each set of one or more suction cups may be actuated independently of the other set(s) of one or more suction cups. A suction cup (or set of one or more suction cups) may be actuated according to a grasping strategy for grasping an item. For example, the control computer 112 may select an item to be grasped, and the control computer 112 may determine a plan to grasp the item such as in connection with picking up the item and placing the item in another location (e.g., a receptacle for a kitting operation, or a tray or segmented conveyor for a singulation operation, etc.).

According to various embodiments, one or more suction cups or vacuum cups on the end effector 104 are actuated based at least in part on a grasping strategy. The grasping strategy may be determined by a control computer 112, and the control computer 112 may send one or more signals (e.g., control signals) to an actuation mechanism. In some embodiments, the actuation mechanism controls actuation of at least one of the one or more suction cups or vacuum cups on the end effector 104. For example, the actuation mechanism can selectively actuate a first set of one or more vacuum cups from among a plurality of vacuum cups on the end effector. The actuation mechanism may be a module running on control computer 112, or a module operatively connected to the robotic arm 102 and/or end effector 104.

Control of a suction cup or vacuum cup included on the end effector 104 may include causing the suction cup or vacuum cup to move between an inactive position and an active position. In the inactive position, the suction cup or vacuum cup may be recessed relative to a bottom of the end effector (e.g., the base plate of the end effector) and/or relative to a position of the suction cup in the active position. In some embodiments, if the suction cup or vacuum cup is in the inactive position, the suction cup or vacuum cup does not engage with an item or other surface when other suction cups included on the end effector are disposed in their corresponding active positions. Conversely, in the active position, the suction cup or vacuum cup may be extended relative to the bottom of the end effector 104 and/or relative to a position of a suction cup in the inactive position. According to various embodiments, a set of suction cups or vacuum cups on the end effector 104 may be selectively controlled to engage an item such as in connection with grasping the item. Selective control of the set of suction cup or vacuum cup may include controlling a first set of suction cup or vacuum cup to move to an active position and/or controlling a second set of suction cup or vacuum cup to move to an inactive position. The first set of suction cup or vacuum cup may be actuated to generate a pressure force between at least one of the first set of suction cup or vacuum cup and the item to be grasped.

Although the example described in connection with a singulation operation (e.g., the use of robotic arm 102 to singulate an item from chute 106 to a position on conveyor 108), various embodiments include a robotic arm that performs a kitting operation. For example, the robotic arm including end effector 104 (e.g., which may include one or more suction cups) may be used to pick one or more items from corresponding determined locations (e.g., from a tray on a shelf) and arrange or assemble the items to form a kit (e.g., including placing the items in a box, tray, or other receptacle). The kit may be formed based at least in part on an order (e.g., an order received via an electronic commerce website).

According to various embodiments, a set of paths or trajectories for singulating an item is determined, and the path or trajectory along which the item is to be singulated is selected from the set of paths or trajectories. The path or trajectory can be selected based on various properties associated with the corresponding paths or trajectories within the set. Examples of the properties associated with the corresponding paths or trajectories that may be used in connection with selecting the path or trajectory include a speed with which the item is to be singulated, a location on the conveyor in which the item is to be singulated, a probability of success that the item is to be singulated according to the particular path or trajectory, an indication of whether another item or object within the workspace intersects with the particular path or trajectory, etc. In some embodiments, the probability of success that the item is to be singulated according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

According to various embodiments, system 100 performs an active measure in order to improve the singulation of an item (e.g., to successfully pick the item from a source pile/flow and place the item on the conveyor). System 100 dynamically updates the path or trajectory of the item during singulation based on a context of the workspace (e.g., a state or condition of the item, a property of the item, another item within the workspace, etc.). For example, in response to determining that a detected state or condition impedes implementation of a current plan to autonomously operate the robotic structure to pick one or more items from the workspace and place each item singly in a corresponding location in a singulation conveyance structure, the robotic structure performs one or more active measures to improve the likelihood of successful singulation (e.g., the robotic structure can determine an active measure that is expected to improve the likelihood of successful singulation based at least in part on the detected state or condition). In some embodiments, the active measure includes using a robotic arm, an end effector of the robotic arm, a movement of a chute or other element of the workspace, or an air blower to reconfigure the source pile/flow or to reconfigure one or more items or debris on the workspace. The active measure can be performed to improve a scanning of a label or identifier on an item to be singulated, to improve the likelihood that an item can be picked up, to improve the grip on an item being singulated, to improve the release of an item from the robotic arm, or to improve operation of two robotic arms that are independently singulating items from the same workspace (e.g., the same source pile/flow).

Figure 2:
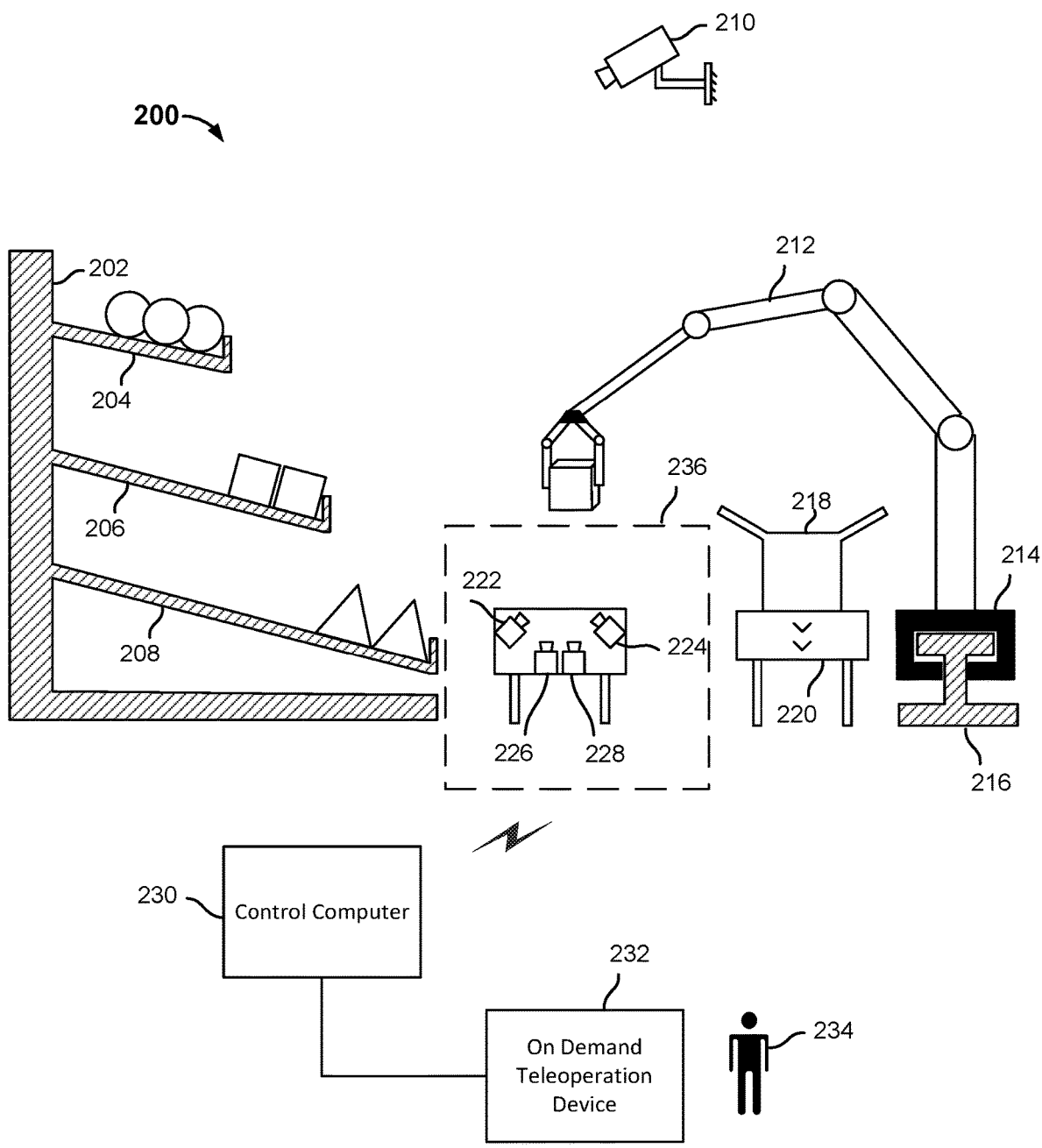
FIG. 2 is a diagram illustrating a kitting system according to various embodiments.

FIG. 2 is a diagram illustrating a kitting system according to various embodiments.

In the example shown, kitting system 200 includes a kitting shelf system 202 and a robotic arm 212. In some embodiments, a kitting system includes a plurality of kitting shelf systems and/or a plurality of robotic arms. The robotic arm may operate autonomously to pick an item (or an object from within an item) from a kitting shelf system and place the item (or object) to a predetermined location. In some embodiments, a robotic arm picks and places one or more items to a predetermined location based at least in part on a plan such as a plan for kitting the one or more items (e.g., to assemble a kit based on an order etc.).

In some embodiments, robotic arm 212 is movable with respect to kitting shelf system 202 and/or with respect to a conveyor or other location at which a receptacle is disposed. In the example shown in FIG. 2, robotic arm 212 is mounted on carriage 214, which is configured to ride along a rail or other linear guide 216 disposed alongside and substantially parallel to the conveyor 220. As an example, the robotic arm 212 may be mounted on a side opposite the kitting shelf system 202. As an example, the robotic arm 212 may be mounted on a same side as the kitting shelf system 202. In some embodiments, one or more robotic arms are mounted on a same side of conveyor 220 as a kitting shelf system and one or more robotic arms are mounted on a side of conveyor 220 that is opposing to kitting shelf system. In various embodiments, a motor, belt, chain, or other source of motive force is applied via a controller (not shown in FIG. 2) to move the carriage 214 and attached robotic arm 212 along the rail or guide 216 to facilitate the automated retrieval of items from one or more kitting shelf systems, and the placement of items in a receptacle (e.g., box, a tray, etc. such as receptacle 218) as the receptacle is moved along conveyor 220. Control of robotic arm may be coordinated based at least in part on one or more items to be picked and placed in receptacle 218, a location of receptacle 218 (e.g., a predetermined location at which the item is to be kitted), and/or a path of receptacle 218 (e.g., based on a determined movement of conveyor 220).

In some embodiments, kitting system 200 includes control computer 230 and/or on demand teleoperation device 232. In the example shown, operation of kitting shelf system 202, conveyor 220; and robotic arm 212, and/or carriage 214 are operated in a coordinated manner under the control of control computer 230. In the example shown, control computer 230 is in communication (e.g., wireless communication) with controllers, not shown in FIG. 2, each configured to control operation of a corresponding element comprising kitting system 200, e.g., kitting shelf system 202; robotic arm 212, conveyor 220, carriage 214, and/or receptacle source (not shown). Although wireless connections are shown in FIG. 2, in various embodiments wired connections or a combination of wired and wireless connections may be used.

In the example shown in FIG. 2, robotic arm 212 has an end effector corresponding to a two-digit gripper. In various embodiments, robotic arm 212 includes one or more other and/or different types of end effectors/retrieval tool, including without limitation a gripper having three or more digits; a gripper having digits with different attributes than as shown, e.g., cushioned digits, smaller digits, larger digits, etc.; and/or a retrieval tool that is not a gripper, such as one configured to pick up items using suction (e.g., one or more vacuum cups), friction, electrostatic force, magnetic force, etc. In some embodiments, the gripper of robotic arm 212 may be interchanged with one or more different end effectors, depending on one or more attributes of an item to be retrieved, e.g., weight, fragility, compressibility, rigidity, size, shape, etc. In some embodiments, the gripper of robotic arm 212 may be used to retrieve and use different end effectors (e.g., gripper-held tools) to pick and place items, depending on one or more attributes of the item to be retrieved, for example. One or more attributes of the items may be determined based at least in part on information obtained from one or more sensors such as camera 210.

In various embodiments, control computer 230 is configured, e.g., by software running on control computer 230, to receive data associated with an invoice, order, part list, pick list, or other list of items to be retrieved and packed together; determine a strategy/plan to fulfill the retrieve and pack the required items; and operate elements of kitting system 200, e.g., kitting shelf system 202; conveyor 220; and robotic arm 212 and/or carriage 214, in coordination to fulfill the requirement(s). In some embodiments, kitting system 200 includes a plurality of kitting shelf systems and/or a plurality of robotic arms, and one or more control computers are controlled to coordinate/operate elements of kitting system 200.

In some embodiments, control computer 230 is configured to receive a list of items to be packed. Control computer 230 may determine which items are associated with which of kitting shelf systems (or which items are associated with a particular shelf of a kitting shelf system such as kitting shelf system 202) and may determine a plan to retrieve and pack the items. In some embodiments, control computer 230 controls a box assembly machine (not shown) or a receptacle source module, and deposit a receptacle on conveyor 220 and controls the conveyor 220 to advance the receptacle to a position to be loaded with a first one or more items. Control computer 230 may control the carriage 214 and/or robotic arm 212 to position the robotic arm 212 to retrieve the first one or more items from the associated a kitting shelf system. Control computer 230 may control kitting shelf system 202, e.g., to ensure the require item(s) in the required quantities are present in the pickup zone (e.g., a presentation face) at the end of kitting shelf system 202 (or a shelf of kitting shelf system 202) nearest to the conveyor 220 and robotic arm 212. Control computer 230 controls robotic arm 212 to retrieve the item(s) from the corresponding pickup zone(s) and places the item(s) in the receptacle (e.g., receptacle 218) before moving on to perform coordinated retrieval and packing of any further items required to be included in that particular kit. In response to a determination that all items have been retrieved and packed (e.g., according to a plan for kitting one or more items), control computer 230 controls conveyor 220 to advance the receptacle (e.g., receptacle 218) to a next stage of fulfillment, not shown in FIG. 2 (e.g., a station at which the box is sealed, labeled, and sent to be shipped).

According to various embodiments, kitting system 200 comprises one or more sensors in the workspace. For example, kitting system may include one or more cameras, bar code scanners, RFID scanners, infrared scanners, and/or 3D scanners, etc. As illustrated in FIG. 2, kitting system 200 may include one or more cameras such as camera 210. A subset of the one or more cameras may have a line of sight to the kitting shelf system 202 and/or one or more items on a shelf of kitting shelf system 202. In some embodiments, kitting system 200 comprises sensor 222, sensor 224, sensor 226, and/or sensor 228. Sensor 222, sensor 224, sensor 226, and/or sensor 228 may be configured in a sensors array. Sensor 222, sensor 224, sensor 226, and/or sensor 228 may be configured to capture information (e.g., machine readable information from an item).

The sensors in the workspace (e.g., camera 210) may capture information pertaining to one or more items on at least one shelf of the kitting shelf system 202. For example, information pertaining to an identifier (e.g., machine readable information) on at least one side of the item may be obtained by the sensors. The one or more identifiers on the items may be used by kitting system 200 in connection with determining that the item has been kitted (e.g., retrieved from kitting shelf system 202 and placed in the receptacle 218), in connection with confirming fulfillment of at least part of a corresponding order (e.g., an order for which item is a constituent part), and/or a determination of whether to replenish kitting shelf system 202 with items (e.g., an item that is a type of item corresponding to the one or more identifiers of an item removed from kitting shelf system by robotic arm 212). The information pertaining to the one or more identifiers on an item may be obtained while the item is on the kitting shelf system 202 (e.g., on a presentation face of a shelf) and/or while the item is being moved by the robotic arm from kitting shelf system 202 to receptacle 218. For example, robotic arm 212 may move an item along a path/trajectory that is determined based at least in part on the item (e.g., a size of the item, a type of the item, a location or expected location of one or more identifiers on the item) and/or a location of one or more sensors within the workspace, such as a barcode scanner, a RFID scanner, etc. The path/trajectory may be predetermined and defined or otherwise specified in a plan such as a plan for kitting the one or more items (e.g., to assemble a kit based on an order etc.). In some embodiments, the path/trajectory is determined based at least in part on a condition that the item is moved through a threshold area or threshold range of one or more sensors. For example, the path/trajectory is determined so that at least one side of the item is moved within the line of sight of at least one sensor.

According to various embodiments, as robotic arm 212 moves an item from kitting shelf system 202 to a receptacle (e.g., receptacle 218 on conveyor 220, etc.) one or more of sensor 222, sensors 224, sensor 226, and/or sensor 228 obtain information pertaining to the item if the item is brought within range/sight of the sensors. For example, sensor 222, sensors 224, sensor 226, and/or sensor 228 may obtain information pertaining to one or more identifiers on the item. The information pertaining to the one or more identifiers may be machine readable information that a computer (e.g., control computer 230) can process and determine information pertaining to the item such as a type of item, a manufacturer, a serial number, a model number, a brand, a lot number, etc. Kitting system 200 may comprise a sensor array comprising sensors arranged to capture information from different angles/lines of sight. For example, sensor 226 and/or sensor 228 may be positioned to have a line of sight upwards (e.g., substantially perpendicular to the ground), and sensor 226 and/or sensor 228 may obtain information corresponding to an identifier on a bottom surface of the item. As another example, sensor 222 and sensor 224 may be positioned at a different angle than sensor 226 and/or sensor 228. Sensor 222 and/or sensor 224 may be positioned to be angled at a forty-five-degree angle relative to the ground. Sensor 222 and/or sensor 224 may be positioned to have a line of sight of at least a side of the item (e.g., a side surface of the item different from the bottom surface of the item that is scanned by sensor 226 and/or sensor 228). In some embodiments, kitting system 200 includes camera 210 configured to obtain information corresponding to one or more identifiers on a top surface of the item while the item is on a shelf of kitting shelf system 202; a sensor (e.g., sensor 226 and/or sensor 228) configured to obtain information corresponding to one or more identifiers on a bottom surface of the item while the item is moved (within range/sight of the sensor) from the kitting shelf system 202 to the receptacle; and a sensor (sensor 222 and/or sensor 224) configured to obtain information corresponding to one or more identifiers on one or more side surfaces of the item (e.g., a surface that is substantially perpendicular to the ground) while the item is moved (within range/sight of the sensor) from the kitting shelf system 202 to the receptacle.

According to various embodiments, a plan for moving an item from the kitting shelf system 202 to a receptacle (e.g., the plan to retrieve and pack the item) comprises a path or trajectory along which robotic arm 212 is to move the item. The path along which the robotic arm 212 is to move the item may be determined based at least in part on a location of one or more sensors (or sensor arrays) within workspace such as sensors 222, 224, 226, and 228. For example, the path may be determined to include moving the item within a threshold range or threshold area of one or more sensors. The threshold range or threshold area may be a defined location or area within which at least one sensor can obtain information from an identifier on an item. As an example, in the case of an RFID scanner, the threshold range or threshold area may be based at least in part on a proximity within which the RFID scanner can obtain information from an RFID tag on an item. As another example, in the case of a barcode scanner, the threshold range or threshold area may correspond to a distance within which the barcode scanner can obtain information from a barcode on the item. As illustrated in FIG. 2, as an item is moved through threshold range or threshold area 236, information pertaining to the item (e.g., the identifiers on the item) may be obtained by sensor 222, sensor 224, sensor 226, and/or sensor 228. Accordingly, the plan may be determined to include a path of the item along which the item is moved through at least part of threshold range or threshold area 236. In some embodiments, kitting system 200 stores a mapping of the threshold range or threshold area 236 to the workspace (e.g., control computer 230 stores a definition of boundaries of the threshold range or threshold area 236). In some embodiments, the threshold range or threshold area 236 is mapped on a sensor-by-sensor basis (e.g., each sensor can be mapped to a threshold range or threshold area).

In some embodiments, determining the plan to kit (or singulate) the item may include determining a manner of picking and placing the item that optimizes the likelihood that the identifier will be read by a sensor within the workspace. Based on the location of one or more sensors within the workspace, the robotic system can determine a side of the item that includes the label, determine a side by which to grasp the item, and a path/trajectory along which the item is to be singulated to expose the label on the item to the one or more sensors (e.g., the vision system or other sensor array such as a barcode reader). In some embodiments, the path is determined based at least in part on a likelihood that at least one of the one or more identifiers will be scanned (or information pertaining to such identifier(s) will be obtained) by the one or more sensors such as sensors 222, 224, 226, and/or 228. The determining the path in a manner to optimize the likelihood that one or more labels or identifiers will be exposed to one or more sensors includes determining a set of paths along which the item may be moved and corresponding probabilities that a label or identifier on the item would be scanned if the item were moved along that path, and selecting the path that has a highest corresponding probability. In some embodiments, a path having a corresponding probability that exceeds a threshold probability, or that is within a predefined percent or number of the set of paths having the highest corresponding probabilities is determined. In some embodiments, a path and corresponding probability that the label or identifier on the item would be scanned if the item were moved along such path are determined, and the probability is compared to a predefined threshold for a minimum desired probability. In response to determining that the probability corresponding to a particular path does not exceed the predefined threshold for a minimum desired probability, a new path and corresponding probability are determined. The robotic system can continue to iterate determining the path and corresponding probability until the robotic system determines that the corresponding probability exceeds the predefined threshold for a minimum desired probability. The determining the path may comprise weighting different factors and maximizing a composite score pertaining to the weighted values of the different factors. The different factors may include a likelihood that the one or more identifiers are obtained, the likelihood of success for picking and placing the item, an expected time to pick and place the item if the item were moved along the corresponding path, the presence/location of another object within the workspace (e.g., another robotic arm, a receptacle, another item, etc.), etc.

According to various embodiments, in response to obtaining information pertaining to an identifier on the item, control computer 230 updates a data structure storing a mapping for information pertaining to an item. The mapping may correspond to a mapping of identifier(s) or items to an order, a mapping of identifier(s) or items to a receptacle, a mapping of identifiers or items to a kitting shelf system (or a particular shelf of the kitting shelf system). The information pertaining to an identifier on the item (that is obtained by the one or more sensors) can be used in connection with determining completion of fulfillment of an order, and/or determining that the kitting shelf system 202 is to be replenished. The information pertaining to an identifier on the item (e.g., label, barcode, QR code, etc.) may be scanned by a sensor. The identifier of the item may be used to look up an attribute of the item such as a size of the item, weight of the item, an indication that the item is fragile, a type of packaging, etc. The attribute of the item may be used in connection with determining/updating a packing or gripping strategy, and/or a packing strategy (e.g., an arrangement in the receptacle according to which the item(s) is to be packed), etc.

While a "kitting" operation is shown in FIG. 2 and described herein with reference to FIG. 2, in various embodiments kitting systems (and kitting shelf systems) and integrated systems as disclosed herein may be used to perform the reverse operation, e.g., by stocking shelves, bins, and/or kitting machines with items removed from an initially full or partly full box of items. For example, in the example shown in FIG. 2, the receptacle 218 may include a plurality of items associated with kitting shelf system 202, and robotic arm 212 may be used to remove items from the receptacle 218 and place the items on the kitting shelf system 202, e.g., from the back or supply end as shown. In some embodiments, a robotic arm provides items (e.g., stocks items) to a feeder portion of a shelf or a feeder portion of a kitting shelf system.

In some embodiments, items on a kitting shelf system, such as kitting shelf system 202, or on a shelf accessed by, or comprised in, a kitting system as disclosed herein, may be bins or trays that comprise objects that are to be "kitted". In some embodiments, the system (e.g., kitting system 200 of FIG. 2) is configured to detect, e.g., based on computer vision or other sensors and/or techniques, that a bin is empty, and to clear the bin from the kitting system or shelf by using a robotic arm to pick up the bin and place the bin in a corresponding empty bin location (e.g., a nearby stack of empty bins, etc.). In some embodiments, automated bin clearing makes room from a next bin that is not empty to move into position on the kitting machine or shelf to enable a robotic arm to access and pick up items from the bin. In some embodiments, in response to determining that a bin/tray is empty, a robotic arm (e.g., robotic arm 212) removes the bin/tray from the corresponding shelf of kitting shelf system 202 and uses the empty bin/tray as a subsequent receptacle for kitting other items/objects. For example, robotic arm 212 can pick up an empty bin/tray from a shelf and place the empty bin/tray on conveyor 220 for use as a receptacle (e.g., receptacle 218).

In various embodiments, a robotic system as disclosed herein includes and/or does one or more of the following, e.g., by operation of a control computer such as control computer 230:

Computer vision information is generated by merging data from multiple sensors, including one or more of 2D cameras, 3D (e.g., RGBD) cameras, infrared, and other sensors to generate a three-dimensional view of a workspace that includes one or more kitting shelf systems (which may correspondingly include one or more shelves of the kitting shelf system). The robotic system determines characteristics of items and/or debris or other abnormalities in the tree-dimensional view of the workspace.

Robotic system coordinates operation of multiple robots to avoid collisions, getting in each other's way, and contending to pick up the same item and/or place an item in the same destination location (e.g., receptacle on the conveyor) as another robot. The robotic system coordinates operation of a plurality of robots operating within a same workspace to perform kitting with respect to a plurality of items/object (e.g., to kit items in different receptacles or within a same receptacle). As an example, in various embodiments, the plurality of robots operate independently to pick and place items.

As another example, the plurality of robots operate to independently pick and place items for different orders (e.g., to place different sets of items in different receptacles). If a risk of collision is detected, responsive action is taken to ensure the plurality of robots do not collide with one another during singulation.

Robotic system coordinates operation of multiple robots to ensure all items are placed in corresponding receptacles. For example, if robot A drops an item system tasks robot B to pick it up; item placed but with improper orientation is picked up and adjusted or moved to another location by same or another robot; two or more items for different orders are placed in a single receptacle results in a downstream robot picking one of the two or more items from the receptacle and placing the item in a new receptacle; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for kitting items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Conveyor movement and/or speed controlled as needed to achieve a desired robot productivity (throughput) and to permit sufficient time for the robot to place an object into the desired receptacle.

In response to a determination that an item is misplaced or dropped, the system assigns a robot or, if needed, a human worker to pick the misplaced item up and place the item back in the applicable kitting shelf system (e.g., on a shelf such as via the feeder portion) or, if available or more optimal, on a receptacle on the conveyor.

Upstream robots controlled to intentionally leave some receptacles open for downstream robots to place items on the conveyor (e.g., in the corresponding receptacles).

Downstream robots controlled to correct errors from an upstream placing an item in a receptacle on the conveyor (e.g., to correct the placement of an item that rests in more than one receptacle such as a tray, or that rests on the conveyor rather than the applicable receptacle, to update a data structure with an association between an identifier for the item or kit/order with the receptacle in which the upstream robot placed the item, etc.).

Failure that cannot be corrected by same or another robot results in an alert being communicated to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or to reconfigure an item to be kitted (e.g., to improve the likelihood that the item is successfully picked from the shelf, or the presentation face of the shelf, and placed on the conveyor such as in a receptacle on the conveyor).

Use sensor data from the workspace environment state system to detect one or more characteristics (e.g., attributes) of the item selected for kitting, determine that grasping or releasing of the item is expected to improve in response to implementation of an active measure, and implement the active measure to improve the grasping or releasing of the item.

Use sensor data to determine that the robotic arm has grasped a plurality of items in connection with kitting of one of the items, determine a plan for releasing the plurality of items in order to place each item singly in a corresponding location in one or more receptacles on the conveyor or to place one of the items back on the shelf/presentation face of the kitting shelf system (e.g., determine a strategy for operating the end effector to release a first subset of the plurality of items at a different time from a second subset of the plurality of items).

Select a path for kitting an item to a receptacle on the conveyor based on an attribute of the item (e.g., a size of the selected item, a weight of the item, etc.) and/or one or more attributes (e.g., characteristics) of an item within a receptacle on the conveyor.

Select a path for kitting an item to a receptacle on the conveyor based on an identifier on the item (e.g., a type of identifier, a location of the identifier, etc.) and/or one or more sensors within the workspace (e.g., a location of a sensor, a range of a sensor, a type of sensor, etc.).

Determine a movement and speed of the robotic arm that picks an item from the kitting shelf system and places the item in the applicable receptacle based at least in part on a speed of a conveyor belt.

Determine a trajectory of the item to be kitted based at least in part on one or more of a characteristic of the item, a characteristic of the workspace environment, and/or a characteristic of the conveyor (e.g., a speed of the conveyor belt).

Determine a probability of successful kitting corresponding to one or more paths/trajectories of an item to be kitted, and select a path/trajectory along which the item is to be kitted based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector be orthogonal to a surface of the item.

Update the ability of the robotic system to detect an empty receptacle. For example, the definition of an empty receptacle used by the robotic system to identify an empty receptacle is updated over time.

Controlling the robotic arm to change an orientation of the item while moving the item from the kitting shelf system to the receptacle (e.g., rotating the wrist of the robotic arm to rotate the item while the item is being moved within a threshold range of a sensor, etc.).

Controlling the robotic arm to iteratively move the item within a threshold range of a sensor to ensure that all the identifiers on the item are obtained (or a requisite set of identifiers is obtained).

According to various embodiments, kitting shelf system 202 includes one or more shelves (e.g., shelves 204, 206, and 208). Each of the one or more shelves may be an integrated unit comprising a side at which items are populated onto the shelf, and a side at which items may be picked up by the robotic arm 212. In some embodiments, at least one of the shelves comprises a gating structure that controls the flow of items to an area in which the items are picked up by the robotic arm 212. For example, a shelf may comprise a presentation face. The presentation face corresponds to an area or surface on which an item is disposed on the kitting shelf system. In connection with kitting of one or more items, robotic arm picks an item (or object from within an item) from at least one presentation face. Kitting shelf system 202 (or a shelf comprised in kitting shelf system 202) may include one or more feeder portions. In some embodiments, kitting shelf system 202 includes a gate structure that is configured to control conveyance of an item from a feeder portion to the corresponding presentation face. The gate structure may be coupled to, or integrated with, the presentation face. In some embodiments, kitting shelf system 202 comprises one or more shelves for which a presentation face is integrated with a corresponding feeder portion (e.g., the presentation face may be static and not movable relative to the feeder portion).

According to various embodiments, the gate structure permits or prevents an item to flow from a feeder portion to the presentation face. The control of flow of items from the feeder portion to the presentation face may prevent items from being cluttered on the presentation face and can assist with providing sufficient space and order of items on the presentation face for a robotic arm to pick and place an item/object from the presentation face. The gate structure may be configured to prevent/inhibit more than a threshold of items to be disposed on a presentation face at any particular time. In some embodiments, the gate structure is toggled (e.g., moved) between an open position and a closed position. As an example, the open position may correspond to an orientation of the gate structure when no item is present on the presentation face. As another example, the open position may correspond to an orientation of the gate structure when a quantity of items on the presentation of items is less than a threshold number of items. As another example, the open position may correspond to an orientation of the gate structure when a weight on (or force applied to) to the presentation face is less than a threshold weight (or threshold force). When the gate structure is oriented in the open position, a flow or conveyance of an item from the feeder portion to the presentation face may be permitted (e.g., unblocked). Conversely, when the gate structure is oriented in the closed position, a flow or conveyance of an item from the feeder portion to the presentation face may be prevented (e.g., the flow of items is blocked).

In some embodiments, a presentation face of a shelf is movable. For example, the presentation face toggles between an empty position and an occupied position. The presentation face may be oriented in any one of the plurality of positions/orientations based at least in part on a context of the workspace (e.g., an item to be provided on the presentation face, a location of a robotic arm to pick the item, a size of the robotic arm, a location of a sensor or camera, etc.).

In various embodiments, the empty position corresponds to a position at which the presentation face is oriented to facilitate a flow/conveyance of one or more items from the feeder portion to the presentation face. For example, the empty position may correspond to a position at which the presentation face is oriented when a quantity of items on the presentation face is less than a threshold number. As another example, the empty position corresponds to a position at which the presentation face is oriented when the presentation face is empty (e.g., does not have any items disposed thereon). As another example, the empty position corresponds to a position at which the presentation face is oriented when a weight on (or force applied to) the presentation face is less than a threshold weight (or threshold force). In some embodiments, each presentation face in a particular kitting shelf system (e.g., kitting shelf system 202) may have a same angle of orientation (e.g., such as an angle relative to a normal to the ground) when orientated in corresponding empty positions. In some embodiments, two or more presentation faces in a particular kitting shelf system (e.g., kitting shelf system 202) have different angles of orientation (e.g., such as an angle relative to a normal to the ground) when orientated in corresponding empty positions. The configuring of shelves (e.g., presentation faces) at different angles may permit a better line of sight for sensors in the workspace, such as camera 210, and such a configuration may improve the information pertaining to the workspace (e.g., identifiers on the items may be obtained more easily or accurately, etc.).

In various embodiments, the occupied position corresponds to a position at which the presentation face is oriented to facilitate picking of one or more items (e.g., by the robotic arm) from the presentation face. The presentation face may be oriented in the occupied position when conveyance/flow of one or more items from the feeder portion to the presentation face is to be prevented. In some embodiments, each presentation face in a particular kitting shelf system (e.g., kitting shelf system 202) may have a same angle of orientation (e.g., such as an angle relative to a normal to the ground) when orientated in corresponding empty positions. In some embodiments, two or more presentation faces in a particular kitting shelf system have different angles of orientation (e.g., such as an angle relative to a normal to the ground) when orientated in corresponding occupied positions. As an example, a first set of one or more presentation faces has an angle of orientation that is different from an angle of orientation of a second set of one or more presentation faces. As another example, each presentation face within a particular kitting shelf system has a different angle of orientation (e.g., such as an angle relative to a normal to the ground) when orientated in corresponding occupied positions. The configuring of shelves at different angles may permit a better line of sight for sensors in the workspace, such as camera 210, and such a configuration may improve the information pertaining to the workspace (e.g., identifiers on the items may be obtained more easily or accurately, etc.).

In some embodiments, the orientation of the presentation face may have a greater tilt downwards the lower the corresponding shelf is to the ground. Such an orientation of the presentation face may enhance one or more sensors (e.g., camera 210 to obtain information pertaining to the presentation shelf or one or more items/objects on the presentation face. In addition, such an orientation may enhance the ability of the robotic arm to engage an item with the end effector of the robotic arm. A robotic arm may have limitations with respect to its wrist extension capabilities/configurations and/or its wrist flexion capabilities/configurations. As an example, the orientation of the presentation face (e.g., at least in the occupied position) is configured based at least in part on an extent of wrist extension that is required by a robotic arm to pick the item/object from the presentation face. The shelf/presentation face may be configured based at least in part on the range of motion of a wrist of a robotic arm in the kitting shelf system (e.g., a range of motion with respect to wrist extension/flexion). An end effector or wrist component of the robotic arm may have size limitations that inhibit the ability of the robotic arm to engage (e.g., at certain angles and heights/locations) an item disposed on a presentation face. Accordingly, the orientation of the presentation face (e.g., at least in an occupied position) of a shelf may be configured to improve the likelihood/ability of the robotic arm to configure its position to engage an item/object on the presentation face with an end effector of the robotic arm at an orthogonal relative to the item/object. The orientation of the presentation face when in the occupied position can correspond to an orientation in which a tray/item disposed thereon is optimally angled (at each level/shelf) for a better vision from an onboard camera (e.g., a camera disposed in the workspace and/or on a robotic arm or chassis thereof). In some embodiments the orientation of the presentation face in the empty position and/or occupied position is based at least in part on a configuration of the corresponding gate structure. For example, if the gate structure is a hinge, the orientation of the presentation face in the empty position and/or occupied position is based at least in part on a range of motion of the hinge.

According to various embodiments, kitting shelf system 202 includes one or more feeder portions. In some embodiments, the kitting shelf system 202 may have a single feeder portion that conveys one or more items to a plurality of presentation faces. In other embodiments, the kitting shelf system 202 has a single feeder portion for each presentation face (e.g., a one-to-one mapping of feeder portions to presentation faces). The feeder portion may be configured to convey an item to a presentation face. As an example, the conveyance of the item may be passive such as via gravity acting on an item disposed on the feeder portion (e.g., in the case that the feeder portion is configured to tilt towards the presentation face). As another example, the conveyance of the item may be at least partially active based on the feeder portion being configured with a conveyor that carries an item from an input location of the feeder portion to the presentation face. In various embodiments, the feeder portion is configured to receive a succession of items on a receiving end (e.g., an input to the feeder portion) and convey the items to a destination end (e.g., an end that is operatively connected/coupled to a presentation face or that otherwise exits the feeder portion to the applicable presentation face). The succession of items may be manually loaded to the feeder portion or kitting shelf system (e.g., via a human operator 234), or the succession of items may be automatically loaded to the feeder portion (e.g., via a robotic arm/component, or based at least in part on the feeder portion being coupled to a chute that conveys items from a source flow/pile).

According to various embodiments, control computer 230 is configured to control a suction system (not shown). For example, control computer 230 controls the suction system in connection with using an end effector comprising one or more vacuum cups. The suction system is controlled to control the pressure within the one or more vacuum cups such as in connection with creating a vacuum seal between a vacuum cup and an item that robotic arm 212 is grasping and moving to a destination location such as receptacle 218. Control computer 230 causes suction system to decrease a pressure within a vacuum cup (e.g., increase suction force on an item grasped by a vacuum cup) to grasp the item, and causes a suction system to increase a pressure within the vacuum cup to release the item. Control computer 230 can further control suction system to reverse a flow of fluid such as compressed air to blow an item away from the end effector such as in connection with creating a quick release of the item being moved.

Figure 3:
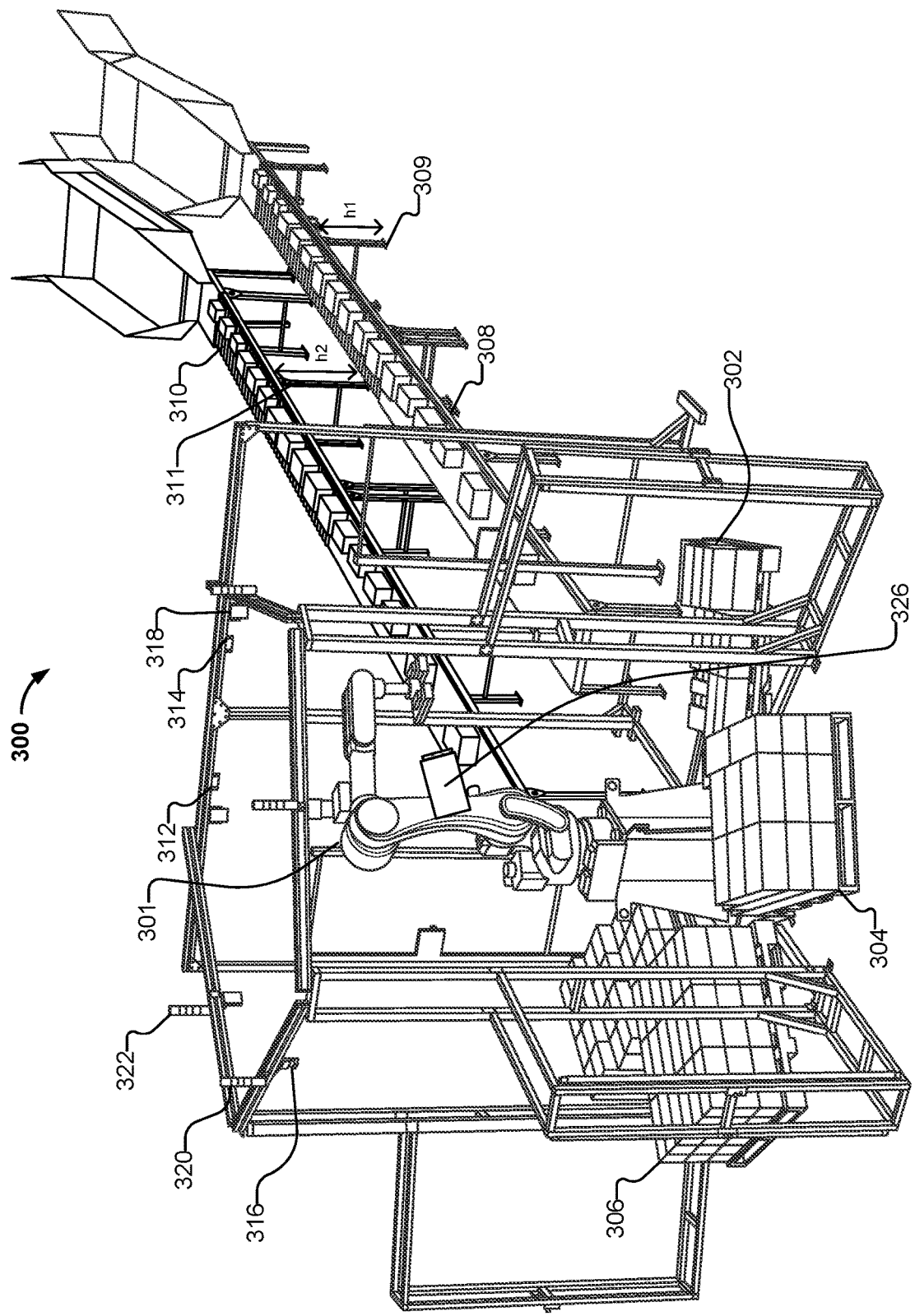
FIG. 3 is a diagram illustrating a palletizing system according to various embodiments.

FIG. 3 is a diagram illustrating a palletizing system according to various embodiments.

In the example shown, system 300 includes a robotic arm 301. In this example the robotic arm 301 is stationary, but in various alternative embodiments robotic arm 301 may be fully or partly mobile, e.g., mounted on a rail, fully mobile on a motorized chassis, etc. In other implementations, system 300 may include a plurality of robotic arms with a workspace. As shown, robotic arm 301 is used to pick arbitrary and/or dissimilar items from one or more conveyors 308 and 310 (e.g., conveyor belts or other sources), and the items on a pallet (e.g., platform or other receptacle) such as pallet 302, pallet 304, and/or pallet 306. In some embodiments, other robots not shown in FIG. 3 may be used to push/pull pallet 302, pallet 304, and/or pallet 306 into position to be loaded/unloaded and/or into a truck or other destination to be transported, etc.

As illustrated in FIG. 3, system 300 may comprise one or more predefined zones. For example, pallet 302, pallet 304, and/or pallet 306 are shown as located within the predefined zones. The predefined zones may be denoted by marking or labelling on the ground or otherwise structurally such as via the frame shown in system 300. In some embodiments, the predefined zones may be located radially around robotic arm 301. In some cases, a single pallet is inserted into a predefined zone. In other cases, one or more pallets are inserted into a predefined zone. Each of the predefined zones may be located within range of robotic arm 301 (e.g., such that robotic arm 301 can place items on a corresponding pallet, or de-palletize items from the corresponding pallet, etc.). In some embodiments, one of the predefined zones or pallets located within a predefined zone is used as a buffer or staging area in which items are temporarily stored (e.g., such as temporary storage until the item is to be placed on a pallet in a predefined zone).

One or more items may be provided (e.g., carried) to the workspace of robotic arm 301 such as via conveyor 308 and/or conveyor 310. System 300 may control a speed of conveyor 308 and/or conveyor 310. For example, system 300 may control the speed of conveyor 308 independently of the speed of conveyor 310, or system 300 may control the speeds of conveyor 308 and/or conveyor 310. In some embodiments, system 300 may pause conveyor 308 and/or conveyor 310 (e.g., to allow sufficient time for robotic arm 301 to pick and place the items). In some embodiments, conveyor 308 and/or conveyor 310 carry items for one or more manifests (e.g., orders). For example, conveyor 308 and conveyor 310 may carry items for a same manifest and/or different manifests. Similarly, one or more of the pallets/predefined zones may be associated with a particular manifest. For example, pallet 302 and pallet 304 may be associated with a same manifest. As another example, pallet 302 and pallet 306 may be associated with different manifests.

System 300 may control robotic arm 301 to pick an item from a conveyor such as conveyor 308 or conveyor 310, and place the item on a pallet such as pallet 302, pallet 304, or pallet 306. Robotic arm 301 may pick the item and move the item to a corresponding destination location (e.g., a location on a pallet or stack on a pallet) based at least in part on a plan associated with the item. In some embodiments, system 300 determines the plan associated with the item such as while the item is on the conveyor, and system 300 may update the plan upon picking up the item (e.g., based on an obtained attribute of the item such as weight, or in response to information obtained by a sensor in the workspace such as an indication of an expected collision with another item or human, etc.). System 300 may obtain an identifier associated with the item such as a barcode, QR code, or other identifier or information on the item. For example, system 300 may scan/obtain the identifier as the item is carried on the conveyor. In response to obtaining the identifier, system 300 may use the identifier in connection with determining the pallet on which the item is to be placed such as by performing a look up against a mapping of item identifier to manifests, and/or a mapping of manifests to pallets. In response to determining one or more pallets corresponding to the manifest/order to which the item belongs, system 300 may select a pallet on which to place the item based at least in part on a model or simulation of the stack of items on the pallet and/or on a placing of the item on the pallet. System 300 may also determine a specific location at which the item is to be placed on the selected pallet (e.g., the destination location). In addition, a plan for moving the item to the destination location may be determined, including a planned path or trajectory along which the item may be moved. In some embodiments, the plan is updated as the robotic arm 301 is moving the item such as in connection with performing an active measure to change or adapt to a detected state or condition associated with the one or more items/objects in the workspace (e.g., to avoid an expected collision event, to account for a measured weight of the item being greater than an expected weight, to reduce shear forces on the item as the item moved, etc.).

According to various embodiments, system 300 comprises one or more sensors and/or sensor arrays. For example, system 300 may include one or more sensors within proximity of conveyor 308 and/or conveyor 310 such as sensor 312, sensor 314, and/or sensor 318. Sensor 318 may be a scanner that scans items (e.g., obtains information of items) as the items pass thereunder on conveyor 308. The one or more sensors may obtain information associated with an item on the conveyor such as an identifier or information on label on the item, or an attribute of the item such as a dimension of the item. In some embodiments, system 300 includes one or more sensors and/or sensor arrays that obtain information pertaining to a predefined zone and/or a pallet in the zone. For example, system 300 may include a sensor 316 that obtains information associated with pallet 306 or the predefined zone within which pallet 306 is located. Sensors may include one or more 2D cameras, 3D (e.g., RGBD) cameras, infrared, and other sensors to generate a three-dimensional view of a workspace (or part of a workspace such as a pallet and stack of items on the pallet). The information pertaining to a pallet may be used in connection with determining a state of the pallet and/or a stack of items on the pallet. As an example, system 300 may generate a model of a stack of items on a pallet based at least in part on the information pertaining to the pallet. System 300 may in turn use the model in connection with determining a plan for placing an item on a pallet. As another example, system 300 may determine that a stack of items is complete based at least in part on the information pertaining to the pallet.

System 300 may communicate a state of a pallet and/or operation of the robotic arm 301 within a predefined zone. The state of the pallet and/or operation of the robotic arm may be communicated to a user or other human operator. For example, system 300 may include a communication interface (not shown) via which information pertaining to the state of system 300 (e.g., a state of a pallet, a predetermined zone, a robotic arm, etc.) to a terminal such as on demand teleoperation device and/or a terminal used by a human operator. As another example, system 300 may include a status indicator within proximity of a predefined zone, such as status indicator 320 and/or status indicator 322.

Status indicator 320 may be used in connection with communicating a state of a pallet and/or operation of the robotic arm 301 within the corresponding predefined zone. For example, if system 300 is active with respect to the predefined zone in which pallet 306 is located, the status indicator can so indicate such as via turning on a green-colored light or otherwise communicating information or an indication of the active status via status indicator 320. System 300 may be determined to be active with respect to a predefined zone in response to determining that robotic arm 301 is actively palletizing one or more items on the pallet within the predefined zone. As another example, if system 300 is inactive with respect to the predefined zone in which pallet 306 is located, the status indicator can so indicate such as via turning on a red-colored light or otherwise communicating information or an indication of the active status via status indicator 320. System 300 may be determined to be inactive in response to a determination that robotic arm 301 is not actively palletizing one or more items on the pallet within the predefined zone, for example in response to a user pausing that predefined zone (or cell), or in response to a determination that a palletization of items on pallet 306 is complete. A human operator or user may use the status indicator as an indication as to whether entering the corresponding predefined zone is safe. For example, a user working to remove completed pallets, or inserting empty pallets, to/from the corresponding predefined zone may refer to the corresponding status indicator and ensure to enter the predefined zone when the status indicator indicates that operation within the predefined zone is inactive.

According to various embodiments, system 300 may use information obtained by one or more sensors within the workspace to determine an abnormal state pertaining to the pallet and/or items stacked on the pallet. For example, system 300 may determine that a pallet is misaligned relative to robotic arm 301 and/or the corresponding predefined zone based at least in part on the information obtained by the sensor(s). As another example, system 300 may determine that a stack is unstable, that items on a pallet are experiencing a turbulent flow, etc. based at least in part on the information obtained by the sensor(s). In response to detecting the abnormal state, system may communicate an indication of the abnormal state such as to an on-demand teleoperation device or other terminal used by an operator. In some embodiments, in response to detecting the abnormal state, system 300 may automatically set the pallet and/or corresponding zone to an inactive state. In addition to, or as an alternative to, notifying an operator of the abnormal state, system 300 may perform an active measure. The active measure may include controlling the robotic arm 301 to at least partially correct the abnormal state (e.g., restack fallen items, realign the pallet, etc.). In some implementations, in response to detecting that an inserted pallet is misaligned (e.g., incorrectly inserted to the predefined zone), system 300 may calibrate the process for modelling a stack and/or for placing items on the pallet to correct for the misalignment. For example, system 300 may generate and use an offset corresponding to the misalignment when determining and implementing a plan for placing an item on the pallet. In some embodiments, system 300 performs the active measure to partially correct the abnormal state in response to determining that an extent of the abnormality is less than a threshold value. Examples of determining that an extent of the abnormality is less than a threshold value include (i) a determination that the misalignment of the pallet is less than a threshold misalignment value, (ii) a determination that a number of dislodged, misplaced, or fallen items is less than a threshold number, (iii) a determination that a size of a dislodged, misplaced, or fallen item satisfies a size threshold, etc.

A human operator may communicate with system 300 via a network such as a wired network and/or a wireless network. For example, system 300 may comprise a communication interface via which system 300 is connected to one or more networks. In some embodiments, a terminal connected via network to system 300 provides a user interface via which human operator can provide instructions to system 300, and/or via which the human operator may obtain information pertaining to a state of system 300 (e.g., a state of robotic arm, a state of a particular pallet, a state of a palletization process for a particular manifest, etc.). The human operator may provide an instruction to system 300 via an input to the user interface. For example, a human operator may use the user interface to pause the robotic arm, pause a palletization process with respect to a particular manifest, pause a palletization process for a particular pallet, toggle a status of a pallet/predefined zone between active/inactive, etc.

In some embodiments, the system palletizes/depalletizes items based at least in part on a cost function (e.g., a cost associated with moving the items). In the example illustrated in FIG. 3, conveyor 308 and conveyor 310 have different heights—conveyor 310 is relatively higher than conveyor 308. For example, the leg 309 to conveyor 308 has a height of h1, and the leg 311 to conveyor 310 has a height h2, and height h2 is larger than height h1. Similarly, in the example illustrated in FIG. 3, the state of the stack of items on pallet 302, pallet 304, and pallet 306 is different—a height of the stacks (e.g., the height at which the top item on the stack rests) is different. As such, in the case of a palletization process, depending on the source location of the item (e.g., conveyor 308 or conveyor 310), and the destination location (e.g., pallet 302, pallet 304, or pallet 306), the distance the item is to be moved may be different. Similarly, a length of a determined path or trajectory for moving an item may be different depending on the source location and/or the destination location. In the case of depalletizing an item from a pallet to a conveyor, the cost of moving an item from the top half of the stack (e.g., a full pallet newly inserted into the system or a predefined max pallet height) to a relatively higher conveyor (e.g., conveyor 310) may be less than moving the item to the relatively lower conveyor (e.g., conveyor 308); and the cost of moving an item from the bottom half of the stack (e.g., relative to a full pallet newly inserted into the system or a predefined max pallet height) to a relatively lower conveyor may be less than moving the item to a relatively higher conveyor.

According to various embodiments, the system determines the source location and/or the destination location based at least in part on a distance between the source location and the destination location. For example, the system may determine a Euclidean distance between a source location and a destination location. In some embodiments, the system determines a set of Euclidean distances corresponding to various permutations or combinations of source locations and destination locations, and the system determines one or more of the source location and the destination location based at least in part on the distance. In some embodiments, the distance between the source location and the destination location is a variable in a cost function, and the source location and/or the destination location is determined based at least in part on a cost of moving the item from the corresponding source location to the corresponding destination location.

According to various embodiments, the source location from which the item is to be picked may be determined based at least in part an attribute of the source location (e.g., a height of the conveyor, a height of the stack, etc.). The attribute of the source location may be used in connection with determining a cost of moving the item from the source location to destination location. For example, the attribute of the source location may impact an amount of work for the robotic arm to move the item from the source location to the destination location, a distance between the item at the source location and the destination location, a length of the path/trajectory along which the item is to travel from the source location to the destination location. In some embodiments, the source location is determined before the item is provided to the robotic arm 301 (e.g., before the item is within range of the robotic arm 301). In an example of palletizing items, the conveyor on which the item is provided to the robotic arm 301 or system 300 may be controlled upstream (e.g., by picking and placing the item on a particular conveyor, by using a gating structure to direct the item, or otherwise moving the item to the determined source location). For example, a system may include a network of conveyors, an item may be placed on a conveyor upstream, and the system may include a gate structure with which the item is selectively directed to various downstream conveyors based at least in part on the determination of the source location. As another example, a system may implement a downstream conveyor selection to determine the conveyor on which the item is placed based on one or more characteristics of the item (e.g., size, packaging type, rigidity, weight, etc.). As another example, the item may be picked from an original source location (e.g., a shelf, a receptacle, etc.) and place the item on conveyor 308. In the foregoing examples, the determination of at least part of the plan for palletizing the items is determined before the item arrives at robotic arm 301 (e.g., before the item is within range of robotic arm 301, and/or before the item is scanned by the sensors such as sensor 312, sensor 314, and/or 318). For example, a control computer may at least loosely determine an order by which the items are to be palletized. The control computer may determine an attribute pertaining to the manner by which the item is to be palletized such as an attribute of the order in which the item is to be palletized, and the control computer may select the conveyor on which the item is to be provided to robotic arm 301 (e.g., determine the source location) based at least in part on the attribute. Examples of the attribute include (i) an indication that the item is to be palletized at a bottom half of the pallet, (ii) an indication that the item is to be palletized at a top half of the pallet, (iii) an indication that the item is to be placed on the stack of items below one or more threshold heights, (iv) an indication that the item is to be placed on the stack of items above one or more threshold height, etc. Various other attributes may be implemented. In some embodiments, the plan for palletizing the item(s) is updated when the item is within range of the robotic arm 301 and/or scanned by sensors that obtain information for items being input to system 300 (e.g., items being input to range of robotic arm 301), such as sensor 312, sensor 314, and/or sensor 318.

Figure 4A:
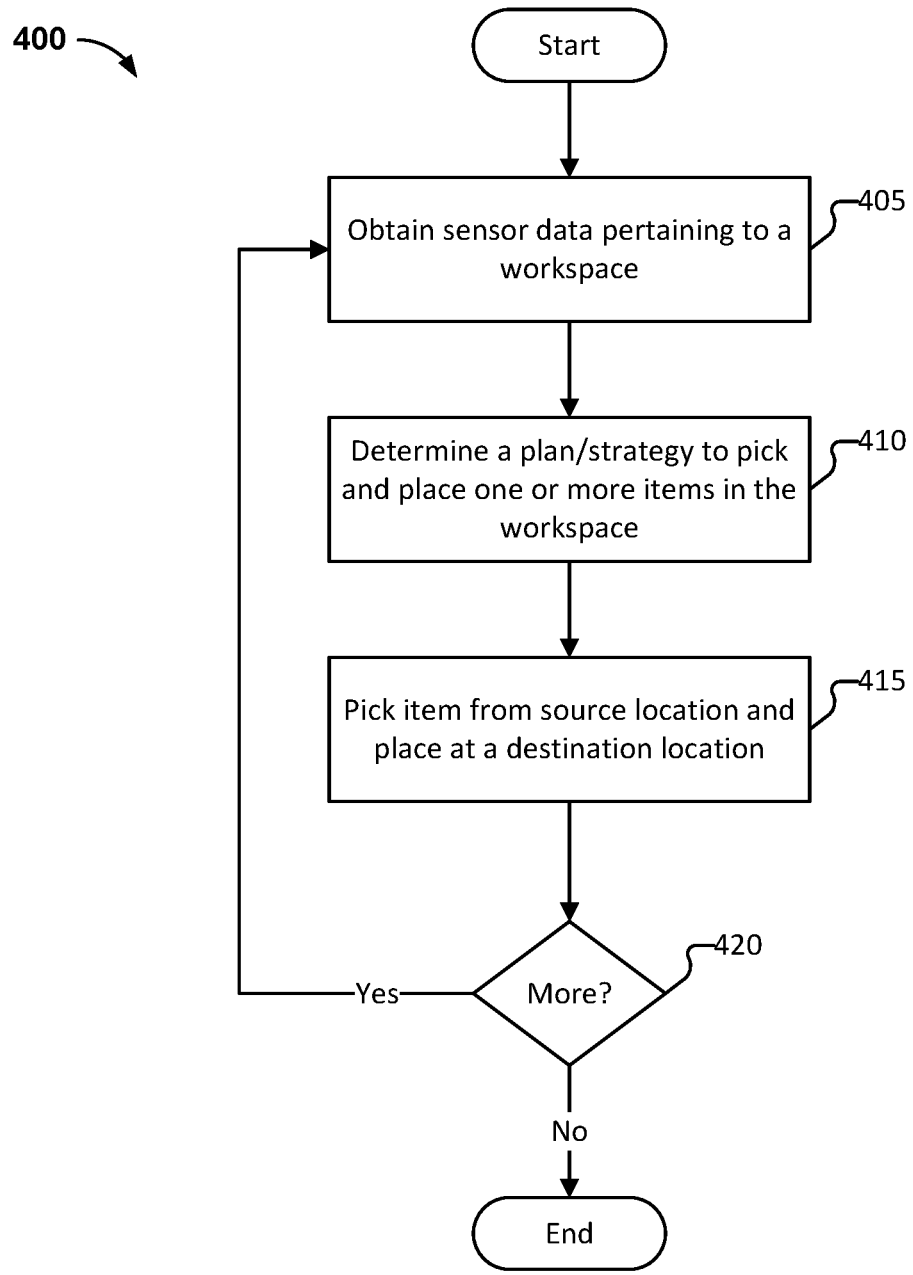
FIG. 4A is a flowchart of a method for singulating items according to various embodiments.

In the example of system 300 in FIG. 4A if the item is determined to be moved to pallet 302, then the system may determine that the cost of moving the item from conveyor 308 is lower than if the item were to be moved from conveyor 310. Accordingly, the system may control for the item to be routed to conveyor 308 (e.g., by controlling a gating structure, by picking and placing the item from an original source location onto conveyor 308, etc.). The system may use a then-current state of the stack of items on the pallet in connection with determining the source location. In some embodiments, in response to obtaining a list of items to be palletized, the system generates a simulation or model for stacking the set of items corresponding to the list of items. The simulation or model may be used in connection with determining the source location and/or controlling the moving of the item to the source location for picking and placing by robotic arm 301.

In various embodiments, elements of system 300 may be added, removed, swapped out, etc. In such an instance, a control computer initializes and registers the new element, performs operational tests, and begins/resumes kitting operations, incorporating the newly added element, for example.

FIG. 4A is a flowchart of a method for singulating items according to various embodiments.

In some embodiments, process 400 is implemented by a robotic system operating to singulate one or more items within a workspace. The robotic system includes one or more processors which operate, including by performing process 400, to cause a robotic structure (e.g., a robotic arm) to pick and place items for sorting.

At 405, sensor data pertaining to the workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items in the source pile/flow of the chute, or an item grasped by the robotic arm. In some embodiments, the sensor data is used in connection with determining one or more characteristics of the conveyor such as determining the slots on the conveyor that are empty or unreserved, determining a speed of the conveyor, and/or determining the characteristics of at least one slot or of at least one item already on the conveyor.

At 410, a plan or strategy to singulate one or more items in the workspace is determined. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot-by-robot basis such that if the robotic system includes a plurality of robots, each robot operates independent of the other robot(s).

According to various embodiments, the plan or strategy to singulate the one or more items in the workspace is determined based at least in part on the sensor data. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyor at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to singulate the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the chute), a destination location on the conveyor at which the item is to be placed, etc. In some embodiments, the presence of one or more other items or objects in the workspace (e.g., an item already on the conveyor) may impact a cost of moving an item according to a path/trajectory, etc.

At 415, the item is singulated. In some embodiments, the item is singulated in response to the plan or strategy for singulating the item being determined. For example, a robotic arm is operated to pick one or more items from the workspace and place each item singly in a corresponding location in a singulation conveyor. The singulation of the item comprises picking the item from the workspace (e.g., from the source pile/flow) and singly placing the item on the conveyor. The robotic system singulates the item based at least in part on the plan or strategy for singulating the item.

At 420, a determination is made as to whether further items are to be singulated. If there are more items, a further iteration of steps 405, 410, and 415 is performed, and successive iterations are performed until it is determined at 420 that there are no more items in the chute (or other receptacle or source) to be picked and placed.

Figure 4B:
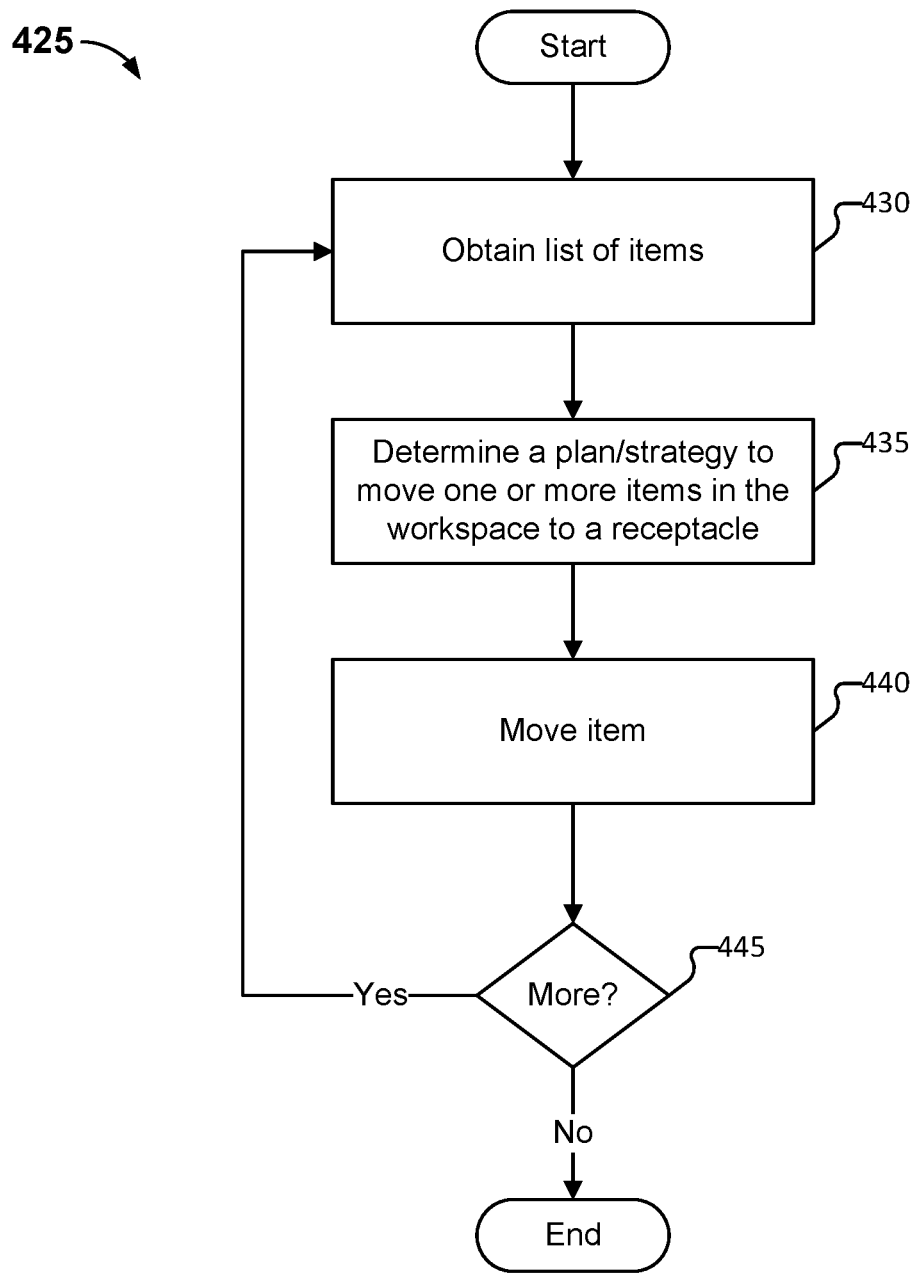
FIG. 4B is a flowchart of a method for kitting items according to various embodiments.

FIG. 4B is a flowchart of a method for kitting items according to various embodiments.

In some embodiments, process 425 is implemented by a robotic system operating to kit one or more items within a workspace. The robotic system includes one or more processors which operate, including by performing the process 425, to cause a robotic structure (e.g., a robotic arm) to pick and place items for assembling a set of items into a kit.

At 430, a list of items is obtained. In some embodiments, a robotic system obtains a list of items to assembly into one or more kits. The list of items may be obtained from an invoice or manifest such as an invoice or manifest corresponding to an order, or otherwise obtained from an order or information indicating that a set of items is to be provided to another location. The list of items may be obtained from a data structure such as a data structure shared with a warehouse system or with another robotic system.

At 435, a plan or strategy to move one or more items in the workspace is determined. In some embodiments, a robotic system determines the plan or strategy to pick at least one item from a shelf (e.g., a shelf of a shelf machine) in the workspace and to place the at least one item in a receptacle such as a box, tray, tote, bag, or other receptacle. The receptacle may be on a conveyor. The plan or strategy to singulate the one or more items may be determined in various embodiments on a robot-by-robot basis such that if the robotic system includes a plurality of robots, each robot operates independent of the other robot(s).

The plan or strategy to move the one or more items may be determined based at least in part on sensor data pertaining to the workspace. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items on a shelf or on a shelf system, or an item grasped by the robotic arm. In some embodiments, the sensor data is used in connection with determining one or more characteristics of the conveyor such as determining the slots or receptacles on the conveyor that are empty or unreserved, determining a speed of the conveyor, and/or determining the characteristics of at least one slot or of at least one item already on the conveyor.

According to various embodiments, the plan or strategy to move the one or more items in the workspace is determined based at least in part on the sensor data. For example, the plan or strategy to move the one or more items includes selecting an item within that is to be moved. The selected item can be identified from among other items or objects within the workspace (e.g., other items on shelves) based at least in part on the list of items and/or sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to move the one or more items includes determining a location on the conveyor (e.g., a slot or receptacle on the conveyor) at which the robotic structure (e.g., the robotic arm) is to place the item. The location on the conveyor at which the item is to be placed can be determined based at least in part on a timestamp, a speed of the conveyor, and one or more characteristics of a slot or receptacle in the conveyor (e.g., an indication of whether the slot is occupied or reserved, an identifier associated with the slot or receptacle such as in the case that an identifier on a receptacle is mapped to a manifest, etc.), and the like, or any combination thereof. As another example, the plan or strategy to move the one or more items includes determining a path or trajectory of the item along which the robotic arm is to move the item. The path or trajectory of the item along which the item is to be moved can be determined based at least in part on a location of one or more other objects within the workspace such as a frame of the chute, other items on a shelf or shelf system, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to move the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the shelf or shelf system), a destination location on the conveyor at which the item is to be placed, a particular receptacle in which to place the item (e.g., different receptacles may be located on different conveyors), etc. In some embodiments, the presence of one or more other items or objects in the workspace (e.g., an item or receptacle already on the conveyor, an item already in the receptacle to which the current item is to be moved, etc.) may impact a cost of moving an item according to a path/trajectory, etc.

At 440, the item is moved. In some embodiments, the item is picked and placed in response to the plan or strategy for singulating the item being determined. For example, a robotic arm is operated to pick one or more items from the workspace and place each item in a corresponding location in a receptacle. The singulation of the item comprises picking the item from the workspace (e.g., from the corresponding shelf) and placing the item on the conveyor or otherwise in the applicable receptacle. The robotic system picks and places the item based at least in part on the plan or strategy for moving the item.

Figure 5:
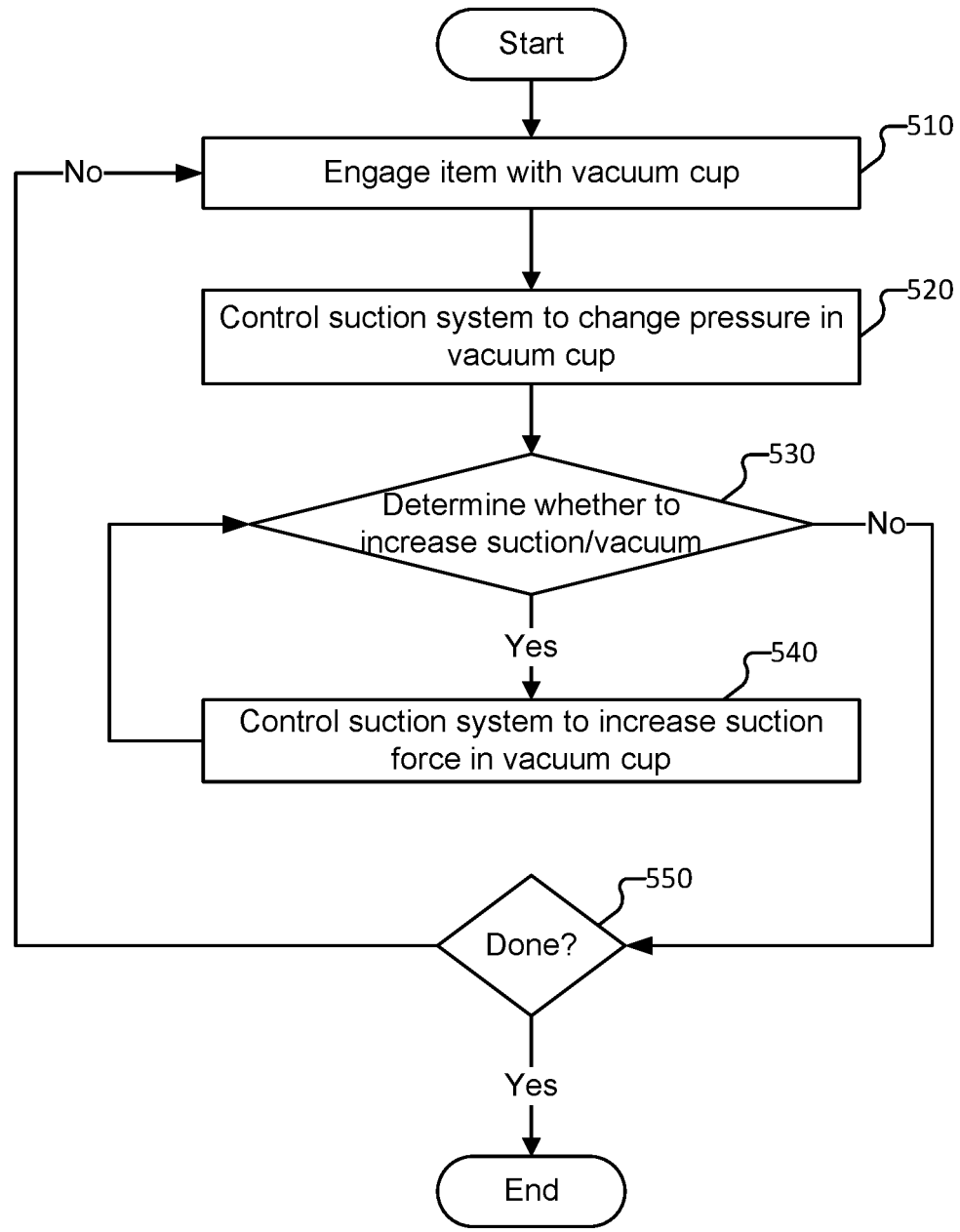
FIG. 5 is a flowchart of a method for grasping an item with an end effector according to various embodiments.
Figure 6:
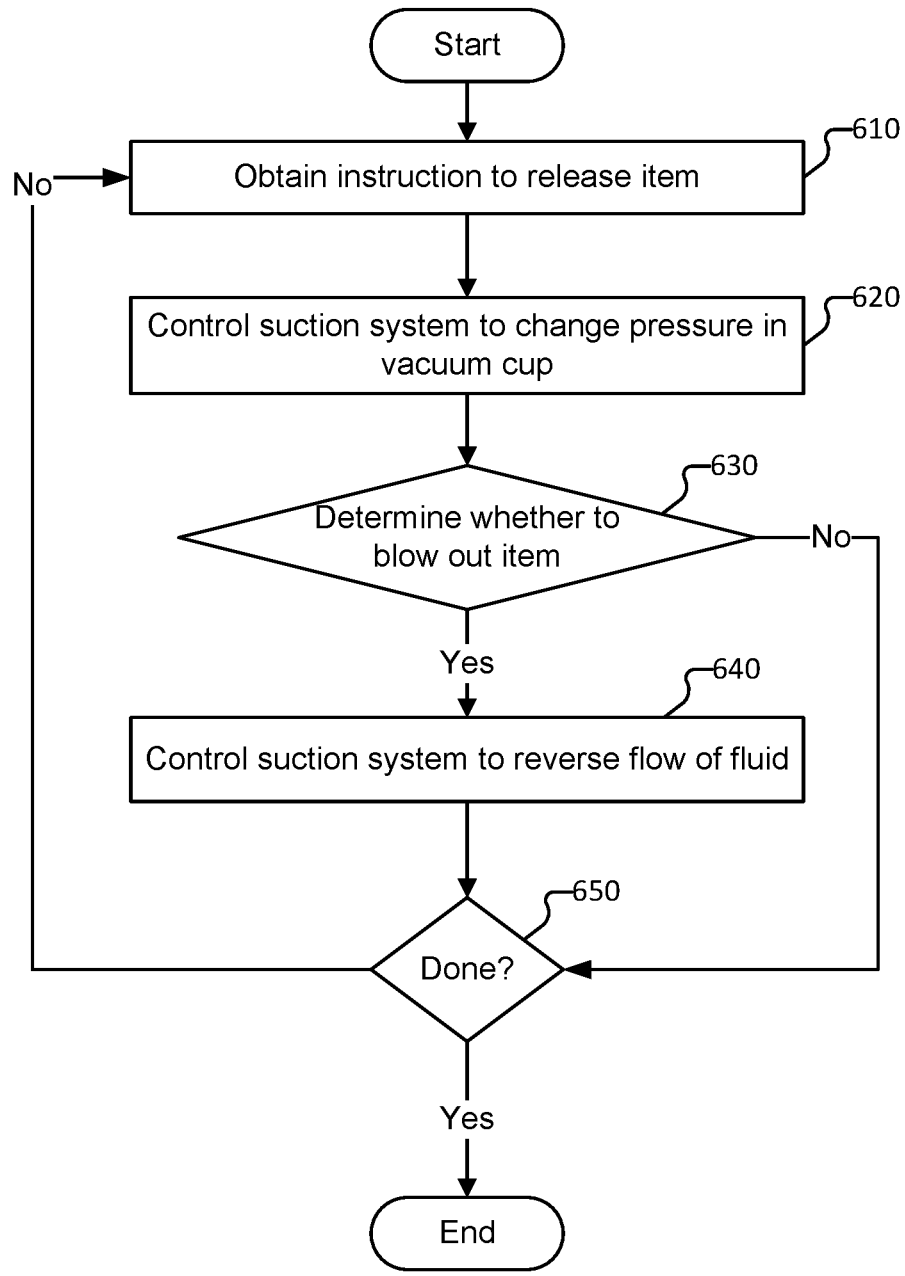
FIG. 6 is a flowchart of a method for releasing an item from an end effector according to various embodiments.

In some embodiments, process 500 of FIG. 5 and/or process 600 of FIG. 6 are invoked in connection with 440.

At 445, a determination is made as to whether further items are to be kitted. If there are more items, a further iteration of steps 430, 435, and 440 is performed, and successive iterations are performed until it is determined at 440 that there are no more items in the chute (or other receptacle or source) to be picked and placed.

Figure 4C:
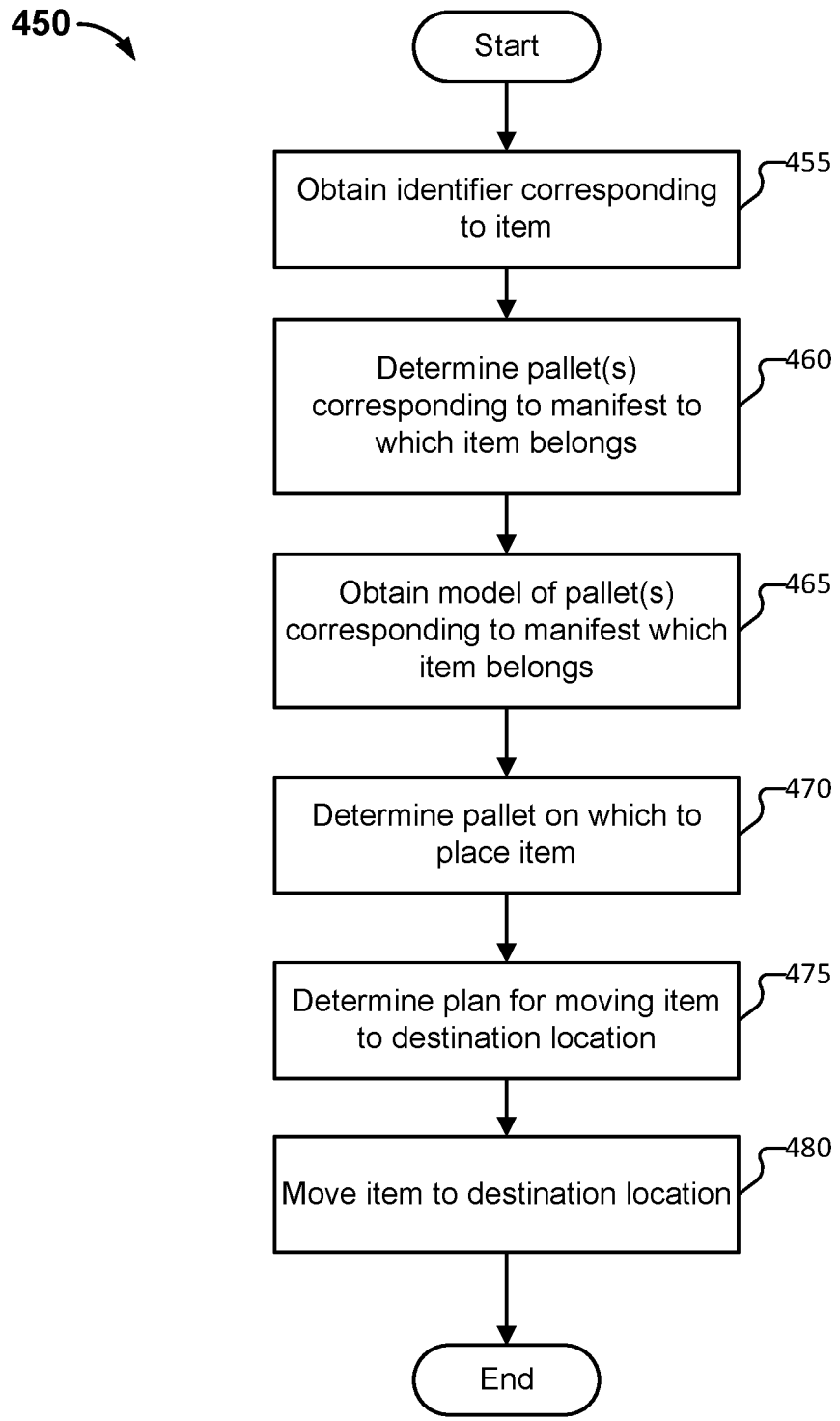
FIG. 4C is a flowchart of a method for palletizing items according to various embodiments.

FIG. 4C is a flowchart of a method for palletizing items according to various embodiments. In various embodiments, the process 450 is performed by a control computer, of a robotic system to pick and place successive items according to a plan.

At 455, an identifier corresponding to an item is obtained. In some embodiments, the system obtains the identifier based at least in part on information obtained by one or more sensors. For example, the identifier may be a barcode, a QR code, a near field communication label, etc., one or more sensors in the workspace such as a sensor (e.g., scanner) at an input to the system may obtain the information pertaining to the identifier. The sensor at the input to the system may be a sensor located within proximity of a conveyor that carries the items to the system. In some embodiments, the identifier corresponding to the item is obtained from a data structure such as a mapping of trays or conveyor slot to items and/or item identifiers. The data structure may have been set by an upstream system that retrieved the items and provided the items for palletization.

At 460, one or more pallets corresponding to a manifest to which the item belongs is determined. In some embodiments, the system may use the identifier corresponding to the item in connection with determining the manifest to which the item belongs. For example, the system may perform a lookup with respect to a mapping of item identifiers to manifests, etc. In response to determining the manifest to which the item belongs, the system may determine the one or more pallets corresponding to the manifest. As an example, if a manifest of items comprises a sufficiently large number of items so that all items on the manifest do not fit on a single pallet, the system may determine a plurality of pallets on which the item may be placed (and still satisfy fulfillment of the manifest with respect to the item). As another example, if the system simultaneously stacks items on a plurality of pallets, the system may determine which one or more pallets of the plurality of pallets correspond to the manifest.

At 465, a model of at least one of the one or more pallets corresponding to the manifest to which the item belongs are determined. According to various embodiments, the system obtains a model for each of the pallets corresponding to the manifest. The system may obtain the model for pallets that correspond to the manifest and for which the system is actively palletizing items on the pallets (e.g., predefined zone in which the pallet is located is not paused or set to inactive).

In some embodiments, the system may obtain a cached model pertaining to a pallet (e.g., a model of the stack of items on the pallet). As an example, cached model may comprise a current model of the stack of items on the pallet. As another example, the cached model may comprise a model according to a previous state of the stack of items on the pallet. In response to a determination that the cached model corresponds to a previous state of the stack of items on the pallet, the system may generate a new model corresponding to a current state of the stack of items on the pallet, or update the cached model to correspond to the current state.

In some embodiments, the system generates the model for the at least one of the one or more pallets corresponding to the manifest to which the item belongs. The system may generate a model of a stack of items on a pallet based at least in part on the information obtained by one or more sensors in the workspace such as a sensor that obtains information pertaining to the predefined zone in which the pallet is located.

At 470, a pallet on which to place the item is determined. In some embodiments, the pallet on which to place the item is determined based at least in part on the corresponding model pertaining to the pallet. The pallet may be determined based at least in part on an updated model or simulation in connection with assessing an expected stack of items if the item were to be placed on the pallet. In the case of a plurality of pallets corresponding to the manifest to which the item belongs, the system may select a pallet on which to place the item based on a determination that the item fits best on the pallet (e.g., on the stack of items), etc.

According to various embodiments, the system may determine the pallet on which to place the item based at least in part on a state of the pallet and/or a state of the plurality of pallets. The system may determine a state of a stack on one or more of the plurality of pallets, and determine the pallet on which to place the item based at least in part on a determination of a stack for which the item has a best fit. The determination that the stack for which the item has a best fit may be based at least in part on a stability of the stack, a model of the stack and/or a model of the stack comprising the item (e.g., after the item is placed on the stack), an expected one or more items that remain to be stacked (e.g., based at least in part on an order and/or manifest), etc. One or more attributes or characteristics pertaining to the item may be used in connection with determining the pallet on which to place the item (e.g., a size, shape, type of packaging, type of item, etc. may be used in connection with modelling the stack and/or determining where to place the item on a stack).

The system may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. The system may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. The system may select a destination location for which the expected fit and/or expected stability satisfies (e.g., exceeds) a corresponding threshold value. Additionally, or alternatively, system may select a destination location that optimizes the expected fit (e.g., of the item on the stack) and/or expected stability (e.g., of the stack).

At 475, a plan for moving the item to a destination location is determined. In some embodiments, in response to determining the pallet on which to place the item, the system determines a destination location on the pallet at which to place the item. The system may also determine a plan for moving the item such as picking the item from the input (e.g., the conveyor) and placing the item at the destination location (e.g., on the pallet). The system may determine the plan for moving the item based at least in part on one or more attributes of the item and/or the model of the pallet (e.g., a current state/properties of the pallet such as a state of the stack of items on the pallet). The plan for moving the item may be determined based at least in part on an expected cost of moving the item from the source location to the destination location (e.g., the cost of moving the item along the path/trajectory), etc. In some embodiments, the plan for moving the item is based at least in part on a state of the stack of items on the pallet and an attribute of the source location (e.g., a height of the conveyor).

At 480, the item is moved to the destination location. In some embodiments, the system controls the robotic arm to pick up the item from the source location, to move the robotic arm to a location from which the item is to be released, and to place the item at the destination location.

In some embodiments, process 500 of FIG. 5 and/or process 600 of FIG. 6 are invoked in connection with 480.

FIG. 5 is a flowchart of a method for grasping an item with an end effector according to various embodiments. According to various embodiments, process 500 may be implemented by system 100 of FIG. 1, system 200 of FIG. 2, and/or system 300 of FIG. 3. Process 500 may be implemented in connection with grasping an item with a vacuum cup. For example, process 500 is invoked in response to a determination by a robotic system (e.g., a control computer associated with the robotic system) that an item is to be picked up such as in connection with moving the item from a source location to a destination location.

At 510, the item is engaged with the vacuum cup. In some embodiments, engaging the item with the vacuum cup includes controlling a robotic arm to move the end effector in a position to grasp the item. For example, the engaging the item with the vacuum cup includes moving a vacuum cup on the end effector to touch the item (e.g., at least part of the item such as a top surface of the item) or to be within proximity of the item (e.g., within a threshold distance of the item). The threshold distance may be configurable based at least in part on one or more attributes of the item and/or a configuration of a suction system used in connection with creating a vacuum seal between the vacuum cup and an item. Examples of the attributes of the item include a size, a center of gravity, a weight, a type of packaging, a rigidity of the packaging, an extent to which the packaging is filled, etc. Various other attributes may be implemented. Examples of the configuration of the suction system include a strength or capacity to create a vacuum seal between the vacuum cup and the item, a pressure that suction system can create within the vacuum cup (e.g., a strength of the pressure force that the suction system can generate to act on the item when engaged with the vacuum cup), etc.

According to various embodiments, the item is engaged with the vacuum cup in response to a determination that the robotic system is grasp the item such as in connection with picking the item up from a source location and moving the item to a destination location. The engaging the item with the vacuum cup may be include in the plan for moving the item.

In some embodiments, the end effector of the robotic arm has a plurality of vacuum cups. The engaging the item with the vacuum cup may include engaging the item with the plurality of vacuum cups or a subset of the plurality of vacuum cups. For example, if the item is smaller than a threshold size, the robotic system determines to use a single vacuum cup or a subset of the plurality of vacuum cups to grasp and pick up the item. As another example, the subset of the plurality of vacuum cups is determined based at least in part on one or more of the attributes of the item and/or a location or position of the item.

At 520, the suction system is controlled to change pressure in the vacuum cup. According to various embodiments, in response to a determination that the item is engaged with the vacuum cup(s) (e.g., that the vacuum cup is in contact with the item, within a threshold proximity of the item, etc.), the robotic system controls the suction system to change the pressure in the vacuum cup (e.g., to create a vacuum seal between the vacuum cup and the item).

According to various embodiments, the suction system is a system that controls the pressure within the vacuum cup. For example, the suction system is a system that controls fluid, such as air, within the vacuum cup (e.g., within the internal cavity). In some embodiments, the suction system is a vacuum generator. The vacuum generator can evacuate air from the space between the vacuum cup and the item. The suction system can be implemented as a pneumatic or an electrical system. For example, the suction cup can be used in connection with an air compressor. Various other means for creating suction (e.g., a vacuum) with respect to the interface between the vacuum cup and the item may be implemented.

At 530, a determination of whether to increase the suction or vacuum is made. In some embodiments, the system determines whether a vacuum seal has been formed with respect to the item. The system may decrease the pressure within the vacuum cup (e.g., within the internal cavity) if the system determines that the suction force is to be increased. In some embodiments, the system determines whether to increase the suction force based at least in part on one or more attributes of the item (e.g., a size, a type of packaging, a weight, etc.). In some embodiments, the system determines whether to increase the suction force based at least in part on plan with respect to moving the item. For example, if the plan indicates that the robotic arm is to move the item quickly, the system may determine that the suction force to be applied to the item is to be relatively large (e.g., to withstand shearing forces that may result from quick movement of the item). In some embodiments, the system determines a particular suction force to be applied to an item (e.g., a particular item) such as based at least in part on the plan for moving the item and/or one or more attributes of the item, and the system determines a corresponding suction to apply to the vacuum cup (e.g., to attain the corresponding pressure within the vacuum cup). If the system determines that the suction force is less than the computed suction to be applied to the vacuum cup for the particular item, the system determines to increase the suction or vacuum. Conversely, if the system determines that the suction force is greater than or equal to the computed suction to be applied to the vacuum cup for the particular item, the system determines not to further increase the suction or vacuum. As an example, in the case of the suction force being greater than the computed suction, the system may control the suction system to reduce the suction force (e.g., reduce the suction to the computed suction, or to within a threshold amount or percent of the computed suction).

In response to a determination to increase the suction or vacuum at 530, process 500 proceeds to 540 at which the suction system is controlled to increase the suction pressure at the vacuum cup. For example, the suction system removes further fluid, such as air, from the vacuum cup (e.g., to decrease the pressure within the vacuum cup). Process 500 then returns to 530, and process 500 repeats 530 and 540 until the system determines that a suction or vacuum at the vacuum cup does not need to be increased. For example, 530 and 540 are repeated until the system determines that a desired suction force is created with respect to the item being engaged.

In response to a determination that the suction or vacuum is not be increased at 530, process 500 proceeds to 550.

At 550, a determination is made as to whether process 500 is complete. In some embodiments, process 500 is determined to be complete in response to a determination that the item is to no longer be engaged, that the robotic arm is to drop/release the item (e.g., at the destination location), an administrator indicates that process 500 is to be paused or stopped, etc. In response to a determination that process 500 is complete, process 500 ends. In response to a determination that process 500 is not complete, process 500 returns to 510.

FIG. 6 is a flowchart of a method for releasing an item from an end effector according to various embodiments. According to various embodiments, process 600 may be implemented by system 100 of FIG. 1, system 200 of FIG. 2, and/or system 300 of FIG. 3. Process 600 may be implemented in connection with grasping/releasing an item with a vacuum cup. For example, process 600 is invoked in response to a determination by a robotic system (e.g., a control computer associated with the robotic system) that an item is to be placed at a destination location (e.g., that the robotic arm has moved the item and is now in position to place the item at the destination location).

At 610, an instruction to release the item is obtained. In some embodiments, the system obtains the instruction to release the item in connection with a determination that the item is to be placed at the destination location. For example, the system may obtain the instruction to release the item in response to determining that the robotic system has moved the item and is in a position to at which the item is to place the item at the destination location. The instruction may be generated in connection with determining that the robotic system has completed the plan (e.g., except for the release/placement of the item at the destination location).

At 620, the suction system is controlled to change pressure in the vacuum cup. In response to determining to release the item, the system controls the suction system to reduce the suction force applied to the item. In some embodiments, the system determines to reduce the suction force based at least in part on a determined suction or vacuum being applied to the item and/or one or more attributes of the item (e.g., weight, size, etc.). The system can control the suction system to change the pressure in the vacuum cup by causing fluid (e.g., air) to be introduced into the vacuum cup (e.g., between the vacuum cup and the item). The change in pressure in the vacuum cup may unseat the vacuum seal between the vacuum cup and the item.

At 630, a determination is made as to whether to blow out the item. In some embodiments, the system determines to blow out the item in order to increase the speed by which the item is released/placed at the destination location. For example, blowing out the item may include reversing the direction of airflow (e.g., from the suction system) to cause air to be blown out the vacuum cup and thus to exert a force on the item such as in a direction opposing the previously applied suction force. The determination of whether to blow out the item may be based at least in part on (i) the plan for moving the item, (ii) a determination that the item is stuck on the vacuum cup (e.g., that the frictional forces acting on the item within the vacuum cup are too great to allow for the item to be released from the vacuum cup), and/or (iii) a determination that a speed or time at which the item is being released is too slow (e.g., less than a threshold speed, or an amount of time that has elapsed during the releasing has exceeded a threshold period of time).

In response to a determination that the item is to be blown out, process 600 proceeds to 640 at which the suction system is controlled to reverse the flow of fluid (e.g., air, gas, etc.). As an example, in response to a determination that the item is to be blown out, the system controls the suction system to direct pressurized gas (e.g., air) from the vacuum cup.

In response to a determination that the item is not to be blown out at 630, process 600 proceeds to 650.

At 650, a determination is made as to whether process 600 is complete. In some embodiments, process 600 is determined to be complete in response to a determination that the item no longer engaged with the vacuum cup, the item was successfully placed at the destination location (e.g., according to the corresponding plan), an administrator indicates that process 600 is to be paused or stopped, etc. In response to a determination that process 600 is complete, process 600 ends. In response to a determination that process 600 is not complete, process 600 returns to 610.

Figure 7A:
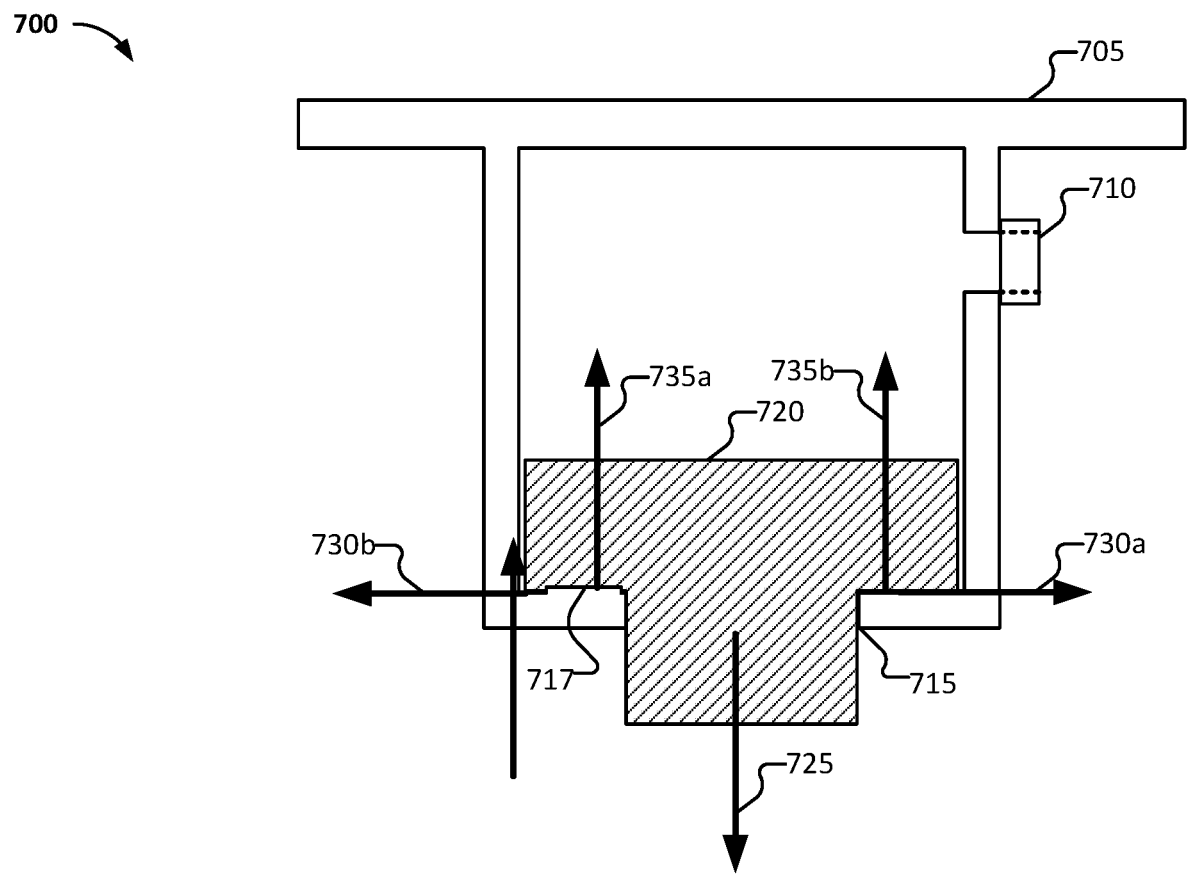
FIG. 7A is a diagram illustrating an example of a vacuum cup according to various embodiments.

FIG. 7A is a diagram illustrating an example of a vacuum cup according to various embodiments.

In the example shown, vacuum cup 700 comprises a base 705, an interface 710, and an entry 715 to the internal cavity. The interface 710 can be connected to a suction system. For example, the interface 710 is a valve or other connector to connect to the suction system (e.g., to form a sealed connection with the suction system to permit ingress/egress of fluid into vacuum cup 700 (e.g., into/out of the internal cavity)).

As illustrated in FIG. 7A, part of an item or a packaging of item 720 is within the internal cavity of vacuum cup 700. In the state shown, the item or packaging of the item 720 has a set of forces acting thereon. For example, a gravity force 725 acts on the item or packaging of the item 720. The gravity force 725 may act on a direction away from the vacuum cup 700, such as in a direction that may cause the item or the packaging of the item 720 to exit vacuum cup 700. As another example, frictional forces 730a and 730b act on the item or packaging of the item 720. Frictional forces 730a and 730b may be caused by the interaction between the interior wall of the internal cavity and item 720. Frictional forces 730a and 730b may act in directions perpendicular to the gravity force 725 (e.g., based on a direction/position of the interior wall or ridge of the internal cavity, such as ridge 717). As another example, normal forces 735a and 735b act on the item based on an interaction between the interior wall of the internal cavity and the item. In the example shown, normal forces 735a and 735b act in a direction that is perpendicular to gravity force 725 (e.g., based on a shape of the internal cavity.

Figure 7B:
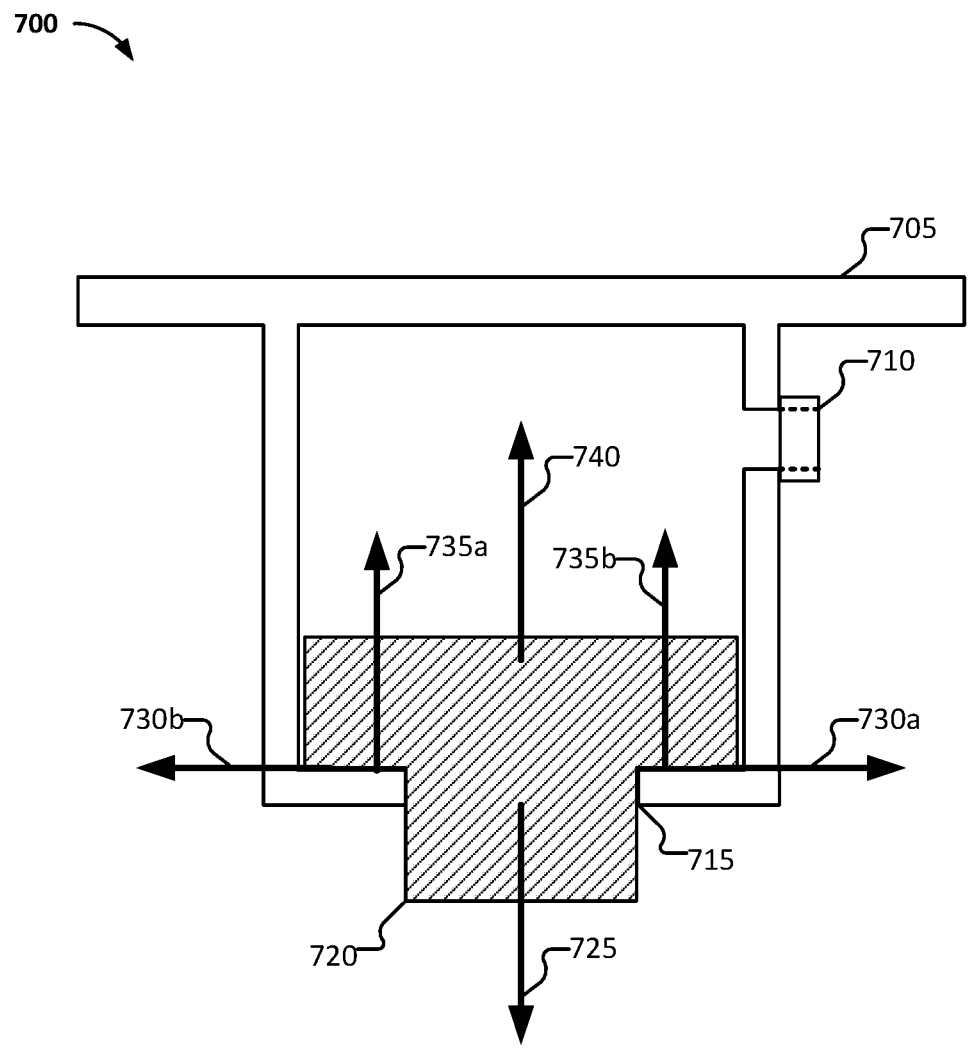
FIG. 7B is a diagram illustrating an example of a vacuum cup according to various embodiments.

FIG. 7B is a diagram illustrating an example of a vacuum cup according to various embodiments.

In the example shown, vacuum cup 700 has an additional force acting on item 720. For example, suction force 740 acts on item 720 in response to a suction system being connected to vacuum cup 700 and the suction system creating a suction (e.g., causing a vacuum within the internal cavity).

In various embodiments, walls or sides of the vacuum cup are curved, rounded, or otherwise sloped in proximity of the opening to the internal cavity. The curvature or sloping of the walls at the opening to the internal cavity of the vacuum cup may serve to facilitate entry of the item or packaging of the item to the internal cavity. A smooth entry lip (e.g., smooth surface, rounded edge, etc.) to the internal cavity of the vacuum cup facilitates the pulling of the item or the packaging of the item (e.g., a polybag) to the internal cavity. In addition, the vacuum cup may be configured to comprise sharp internal ridges within the internal cavity (e.g., the interior walls of the internal cavity).

Figure 7C:
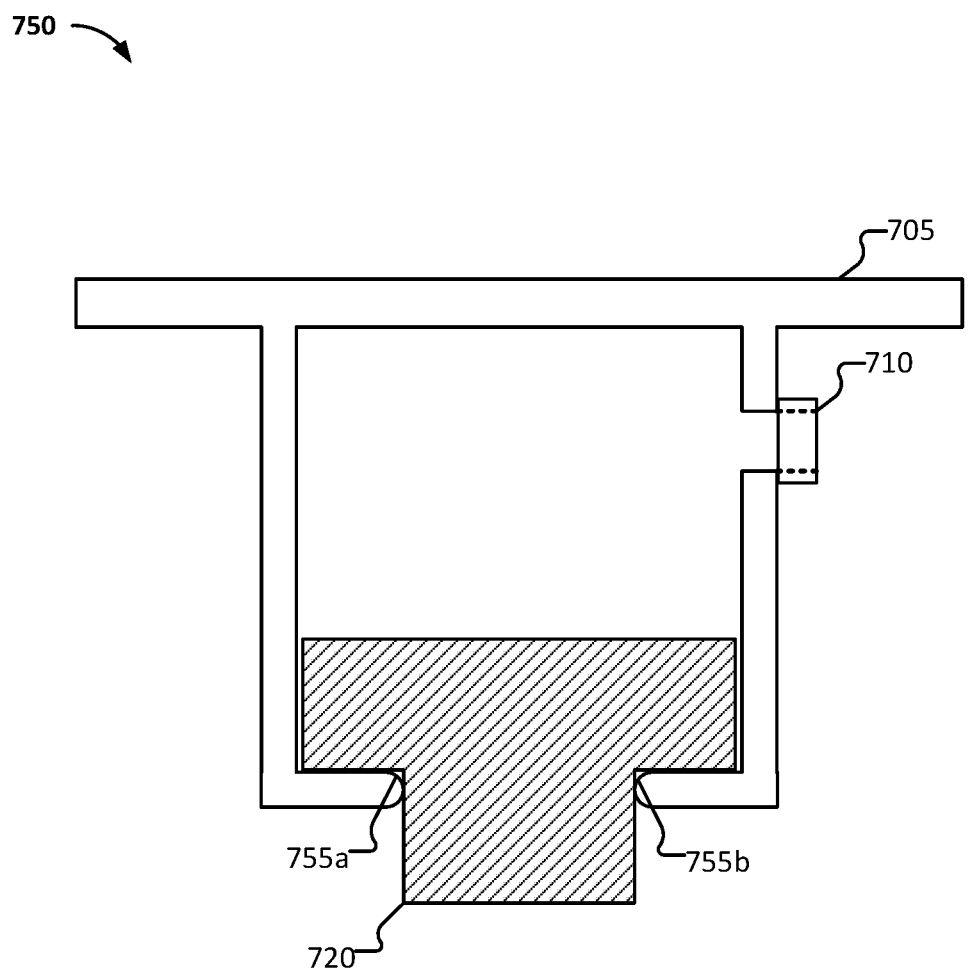
FIG. 7C is a diagram illustrating an example of a vacuum cup according to various embodiments.

FIG. 7C is a diagram illustrating an example of a vacuum cup according to various embodiments.

In the example shown, vacuum cup 750 has a curved or rounded walls/sides 755a and 755b at the entry to the internal cavity. The curvature or rounding of walls/sides 755a and 755b may promote entry of item 720 or packaging of item 720 upon application of suction. Without a smooth shape to the walls or sides of the vacuum cup (e.g., at least at the entry to the internal cavity), some items may resist the suction flow and thus a weaker seal may be formed with the item.

Figure 7D:
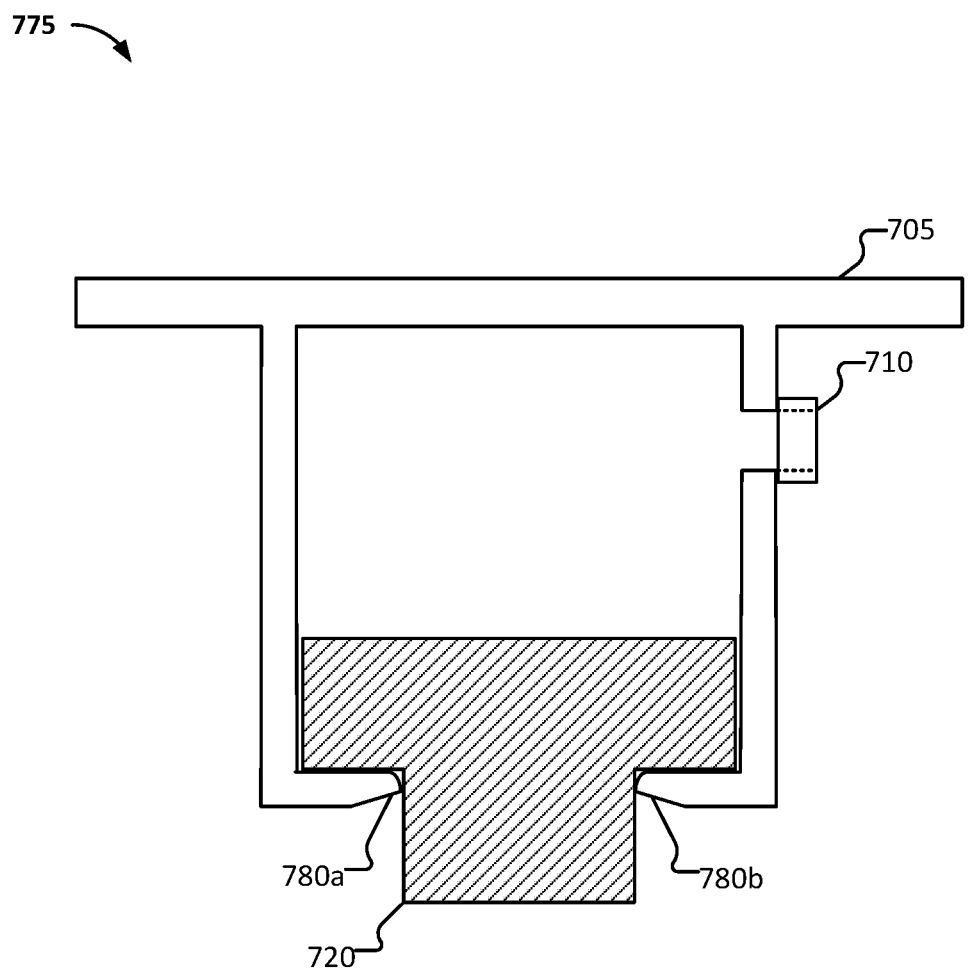
FIG. 7D is a diagram illustrating an example of a vacuum cup according to various embodiments.

FIG. 7D is a diagram illustrating an example of a vacuum cup according to various embodiments.

In the example shown, vacuum cup 775 has a sloped walls or sides 780a and 780b at the entry to the internal cavity. For example, walls or sides 780a and 780b slope towards entry of the internal cavity. In addition, the edges of walls or sides 780a and 780b may be rounded. The sloping of the walls or sides 780a and 780b and/or a curvature or rounding of edges of such may promote entry of item 720 or packaging of item 720 upon application of suction. Without a smooth shape to the walls or sides of the vacuum cup (e.g., at least at the entry to the internal cavity), some items may resist the suction flow and thus a weaker seal may be formed with the item.

Figure 8A:
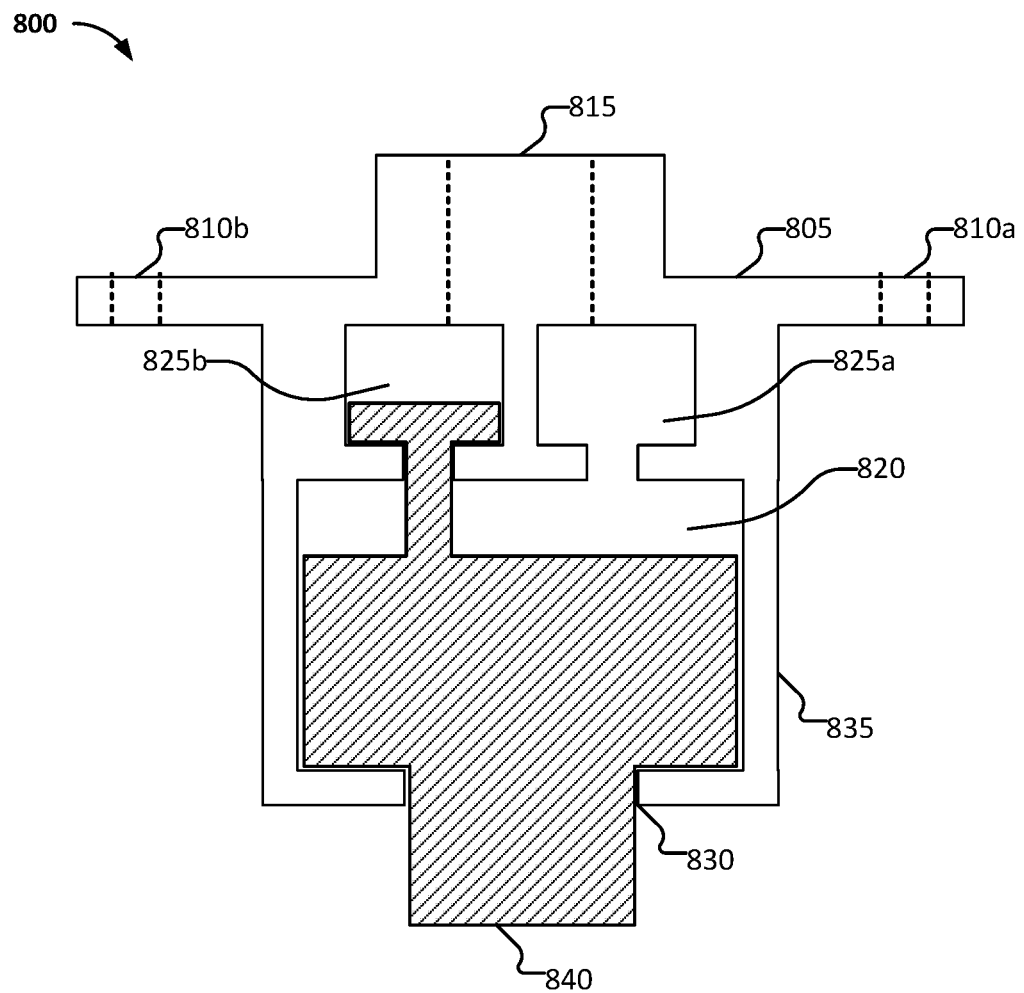
FIG. 8A is a diagram illustrating an example of a vacuum cup according to various embodiments.

FIG. 8A is a diagram illustrating an example of a vacuum cup according to various embodiments. According to various embodiments, vacuum cup 800 may be used on a robotic arm implemented by system 100 of FIG. 1, system 200 of FIG. 2, and/or system 300 of FIG. 3.

In the example shown, vacuum cup 800 comprises a base 805, an interface 815, and an entry 830 to a primary internal cavity 820. The interface 815 can be connected to a suction system. For example, the interface 815 is a valve or other connector to connect to the suction system (e.g., to form a sealed connection with the suction system to permit ingress/egress of fluid into vacuum cup 800 (e.g., into/out of the primary internal cavity and/or secondary internal cavities). According to various embodiments, vacuum cup 800 comprises mounting hole 810a and/or mounting hole 810b. Mounting hole 810a and mounting hole 810b may be used to mount the vacuum cup 800 to an end effector of a robotic arm. For example, vacuum cup 800 may be bolted or strapped to the end effector via mounting hole 810a and/or mounting hole 820b. Various other mechanisms for mounting vacuum cup 800 to an end effector of a robotic arm may be implemented. According to various embodiments, base 805 is made of a rigid material such as a rigid polymeric material that provides support for vacuum cup 800 and maintains a mounting of vacuum cup 800 to an end effector. In some embodiments, base 805 is more rigid than a side wall 835 of vacuum cup. Side wall 835 may be a softer material that is flexible (e.g., a material that is strong enough to maintain a vacuum seal with item 840 but that is flexible or soft enough to not damage an item or packaging of the item).

As illustrated, vacuum cup 800 comprises a primary internal cavity 820. According to various embodiments, vacuum cup 800 comprises one or more secondary internal cavities. For example, as illustrated in FIG. 8A, vacuum cup 800 comprises a plurality of secondary internal cavities—secondary internal cavity 825a and secondary internal cavity 825b. In some embodiments, primary internal cavity 820 is larger than a secondary internal cavity (e.g., secondary internal cavity 825a or secondary internal cavity 825b). In some embodiments, primary internal cavity 820 is larger than an aggregate of all secondary internal cavities (e.g., secondary internal cavity 825a and secondary internal cavity 825b). As an example, a volume of primary internal cavity 820 is larger than secondary internal cavity 825a and secondary internal cavity 825b (e.g., alone or in combination). As another example, a distance from an interior wall of primary internal cavity 820 to an opposing interior wall of primary internal cavity is greater than a distance between an interior wall of a secondary internal cavity and an opposing interior wall of the secondary internal cavity. In some embodiments, primary internal cavity 820 is at least two times larger than a secondary internal cavity (e.g., a volume of primary internal cavity is at least 200% the volume of secondary internal cavity 825b). In some embodiments, primary internal cavity 820 is at least 3 times larger than a secondary internal cavity. In some embodiments, primary internal cavity 820 is at least 5 times larger than a secondary internal cavity.

In the example shown, secondary internal cavity 825a and secondary internal cavity 825b are separated by a wall and individually connect to a channel to interface 815. In some embodiments, secondary internal cavities are distinct cavities. In some embodiments, secondary internal cavities are integrated and connect to interface 815 through a common channel. According to various embodiments, the secondary internal cavities branch from the primary internal cavity. The secondary internal cavities can each have a corresponding entry from the primary internal cavity.

According to various embodiments, a distance from an interior wall of primary internal cavity 820 to an opposing interior wall of primary internal cavity 820 is greater than a distance across opening to the primary internal cavity 820 (e.g., entry 830 of vacuum cup 800). For example, in the case of entry 830 being circular, the distance between two opposing interior walls of primary internal cavity 820 is greater than a diameter of entry 830.

In some embodiments, the internal shape of primary internal cavity 820 may define one or more ridges. For example, one or more interior walls of primary internal cavity may include one or more ridges. In some embodiments, the internal shape of one or more of secondary internal cavity 825a or secondary internal cavity 825b defines one or more ridges.

In some embodiments, one or more edges of vacuum cup 800 at entry 830 are rounded. Rounded edges at entry 830 promote an easier ingress/egress of an item or packaging of the item to within vacuum cup (e.g., into primary internal cavity 820).

In the example shown, in response to a suction force being applied (e.g., in response to a suction system creating a vacuum seal with item 840), at least part of item 840 or the packaging of item 840 enters primary internal cavity 820. For example, if item 840 comprises a polybag packaging, part of the polybag enters entry 830 and is pulled into primary internal cavity 820. As the part of the polybag enters vacuum cup 800, the remaining packaging around item 840 is tightened, which may thereby promote movement of item 840 with less sway or other dynamic forces being generated. Further, as the part of the polybag enters vacuum cup 800, a vacuum seal between vacuum cup 800 and item 840 is improved.

In some embodiments, as shown in FIG. 8A, in response to a suction force being applied (e.g., in response to a suction system creating a vacuum seal with item 840), at least part of item 840 or the packaging of item 840 enters secondary internal cavity 825b. Item 840 or a packaging of item 840 may enter secondary internal cavity 825 if item 840 is sufficiently loosely packaged (e.g., in a polybag), or if item 840 is sufficiently flexible. If item 840 is sufficiently loosely packaged or item 840 is sufficiently flexible, parts of item 840 may respectively enter (e.g., be pulled into) a plurality of secondary internal cavities.

Figure 8B:
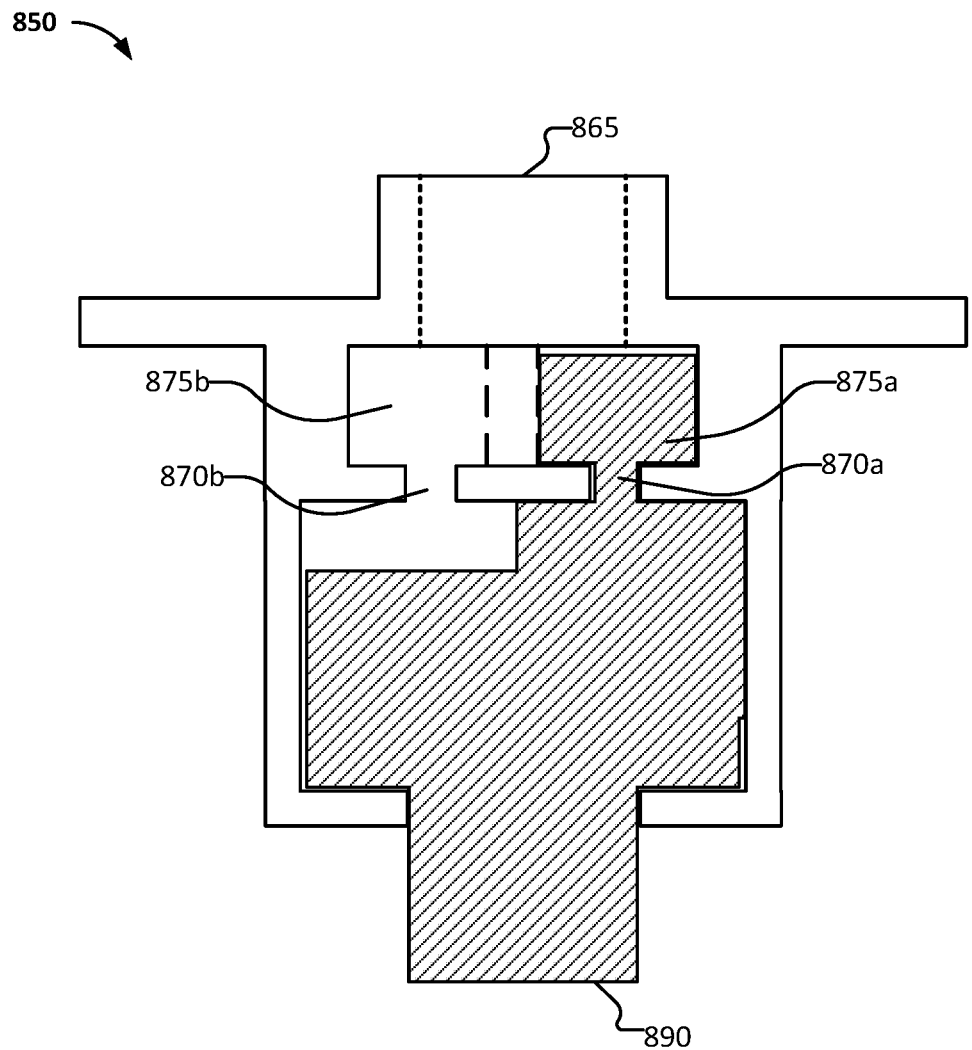
FIG. 8B is a diagram illustrating an example of a vacuum cup according to various embodiments.

FIG. 8B is a diagram illustrating an example of a vacuum cup according to various embodiments. According to various embodiments, vacuum cup 850 may be used on a robotic arm implemented by system 100 of FIG. 1, system 200 of FIG. 2, and/or system 300 of FIG. 3.

In the example shown, vacuum cup 850 comprises two secondary internal cavities (e.g., secondary internal cavity 875a and secondary internal cavity 875b) that each have corresponding entries (e.g., entry 870a and entry 870b), and that are integrated to share a connection to interface 865. In response to suction being applied, part of item 890 or the packaging of item 890 may enter the primary internal cavity, and one or more of secondary internal cavity 875a and secondary internal cavity 875b. For example, part of item 890 or the packaging of item 890 may proceed through one or more of entry 870a and entry 870b.

Figure 9:
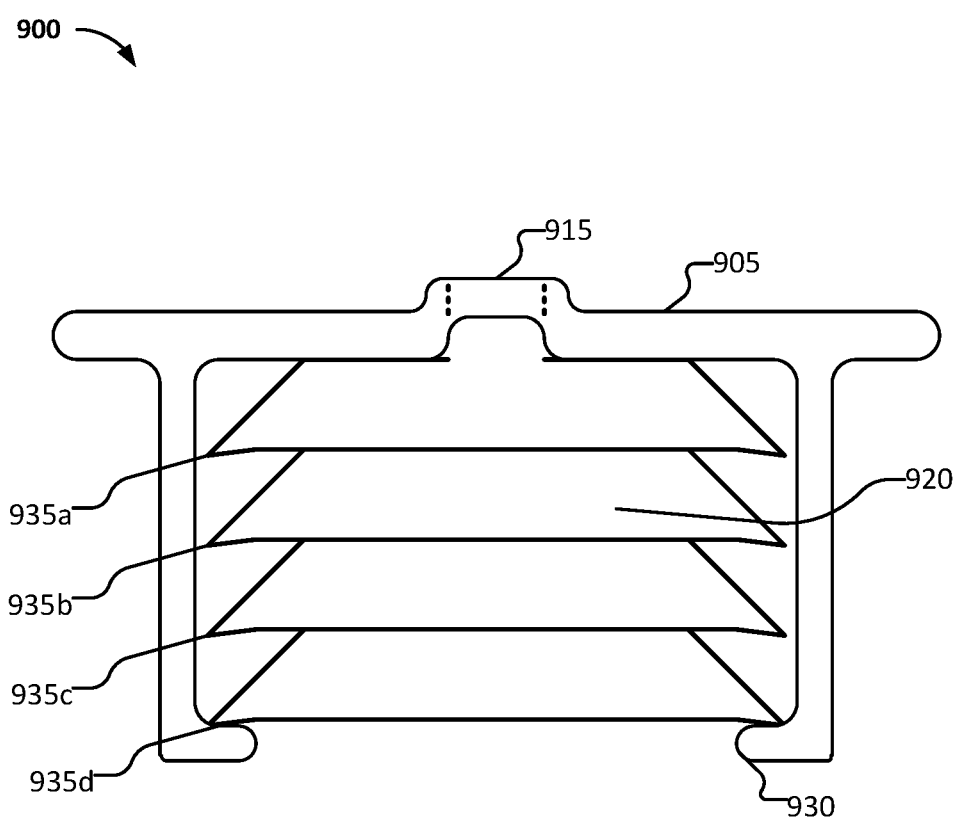
FIG. 9 is a diagram illustrating an example of a vacuum cup according to various embodiments.

FIG. 9 is a diagram illustrating an example of a vacuum cup according to various embodiments. According to various embodiments, vacuum cup 900 may be used on a robotic arm implemented by system 100 of FIG. 1, system 200 of FIG. 2, and/or system 300 of FIG. 3.

In the example shown, vacuum cup 900 comprises a base 905, interface 915, internal cavity 920, and entry 930. As illustrated with respect to entry 930, the edges at entry 930 may be rounded to promote entry of the item to within vacuum cup 900.

According to various embodiments, vacuum cup 900 comprises a plurality of internal ridges—internal ridges 935a, 935b, 935c, and 935d. In some embodiments, the plurality of internal ridges is formed via a profile of one or more walls that define internal cavity 920 (e.g., the primary internal cavity and/or secondary internal cavity). One or more internal ridges within an internal cavity can increase a surface area of an internal surface of the internal cavity, and a total frictional force applied to the item (e.g., the part of the packaging and/or item that enters the internal cavity when a vacuum seal is created). The one or more ridges may serve to resist shearing forces with respect to the item (e.g., particularly shearing forces that act in a manner/direction that is opposed to the grasping of the item via the vacuum cup, etc.). For example, if the packaging and/or item within the internal cavity wraps around/engages one or more ridges within the internal cavity, forces applied to the item in both the downward and lateral directions (e.g., forces acting to remove the item from the grasp of the vacuum cup) will generally have to overcome a much greater frictional force to unseat the item and release the vacuum seal. In the example shown, internal ridges 935a, 935b, 935c, and 935d form small pockets that extend downward towards entry 930. Such a shape of an internal ridge promotes greater resistance to unseating of a vacuum seal with an item because an item or packaging of an item is pulled into internal cavity 920 and can be pulled towards the internal ridge and down into the pockets to cause the item or the packaging of the item to wrap around the internal profile of internal cavity 920.

In some embodiments, internal cavity 920 comprises one or more ridges that protrude from an interior wall of internal cavity 920. For example, internal cavity 920 can have ridges that form a ribbed profile of the interior walls.

Figure 10:
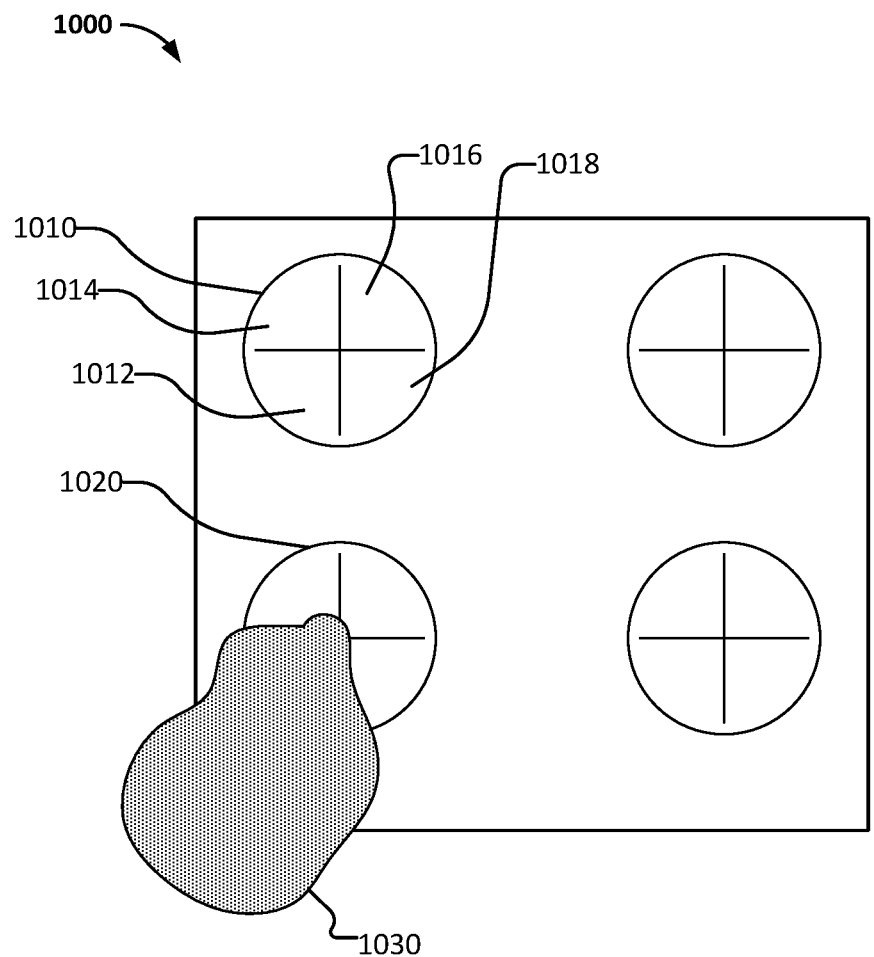
FIG. 10 is a diagram illustrating an example of a vacuum cup according to various embodiments.

FIG. 10 is a diagram illustrating an example of a vacuum cup according to various embodiments. According to various embodiments, end effector 1000 may be used on a robotic arm implemented by system 100 of FIG. 1, system 200 of FIG. 2, and/or system 300 of FIG. 3.

In the example shown, end effector 1000 comprises a plurality of vacuum cups, such as vacuum cup 1010 and vacuum cup 1020. One or more of the vacuum cups may include pinching flaps or other mechanisms (e.g., flexible flaps, etc.) that permit entry of a part of packaging or item to the internal cavity but that restrict or impede remove of the part of packaging or item from the internal cavity. For example as illustrated in FIG. 10, vacuum cup 1010 comprises four pinching flaps (e.g., flap 1012, flap 1014, flap 1016, and flap 1018) that cover an entry to vacuum cup 1010 but that are sufficiently flexible to permit an item (or part of an item or packaging of an item) to enter (e.g., be pulled into) an internal cavity of vacuum cup 1010.

In some embodiments, the pinching flaps may be biased towards a closed position. For example, in response to a suction force being applied to an item and at least part of the item (or packaging of the item) being pulled into the vacuum cup, the pinching flaps may be biased to be closed (e.g., to the rest position such as illustrated with respect to vacuum cup 1010). Accordingly, as item 1030 is pulled into vacuum cup 1020, the corresponding pinching flaps are biased to the closed position and thus can serve to grasp or hold onto the item. The pinching flaps may therefore provide further resistance to the item 1030 from falling from the grasp of vacuum cup 1020.

Vacuum cups 1010 and/or 1020 can include internal cavities (including ridges) similar to vacuum cup 800 of FIG. 8A, vacuum cup 850 of FIG. 8B, vacuum cup 900 of FIG. 9, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A vacuum cup, comprising:
   one or more walls that define (i) a first internal cavity and (ii) an opening to the first internal cavity, wherein the first internal cavity is defined at least in part by an interior surface adjacent to the opening to the first internal cavity, the interior surface defining an internal ridge positioned to mechanically engage a material of an item drawn into the first internal cavity through the opening at an angle such that the mechanical engagement resists the material being removed from the first internal cavity via the opening;
   a secondary internal cavity, the secondary internal cavity having an opening from the first internal cavity; and
   an interface configured to connect to a suction system configured to create a vacuum within the first internal cavity,
   wherein at least part of the item is within the secondary internal cavity when the vacuum seal is engaged between the vacuum cup and the item.

2. The vacuum cup of claim 1, wherein a length across an opening of the first internal cavity is at least 2 cm.

3. The vacuum cup of claim 1, wherein:
   the one or more walls define an internal ridge within the first internal cavity; and
   the internal ridge is substantially perpendicular to the surface at which the vacuum cup engages the item to be picked up.

4. The vacuum cup of claim 1, wherein:
   the surface at which the vacuum cup engages an item to be picked up is located on an outer surface of at least one wall of the one or more walls, the outer surface being outside the internal cavity; and
   the internal ridge is defined at least in part by an internal surface of the at least one wall of the one or more walls, the internal surface corresponding to an interior wall of the internal cavity.

5. The vacuum cup of claim 1, wherein the secondary internal cavity is smaller than the first internal cavity.

6. The vacuum cup of claim 1, wherein the at least part of the item within the secondary internal cavity is a packaging of the item.

7. The vacuum cup of claim 1, wherein the material of the item comprises a polybag.

8. The vacuum cup of claim 1, wherein the at least part of the item engages an interior wall of the secondary internal cavity when the vacuum seal is engaged between the vacuum cup and the item.

9. The vacuum cup of claim 1, wherein a cross sectional length between two interior walls of the secondary internal cavity is greater than a cross sectional length of an opening to the secondary internal cavity.

10. The vacuum cup of claim 1, wherein an opening from the first internal cavity to the secondary internal cavity is smaller than an opening between the first internal cavity and an exterior of the vacuum cup.

11. The vacuum cup of claim 1, wherein interior walls of the secondary internal cavity define an interior ridge, and at least part of the interior ridge is in contact with the at least part of the item when the vacuum seal is engaged between the vacuum cup and the item.

12. The vacuum cup of claim 1, wherein a cross sectional length between two interior walls of the first internal cavity is greater than a cross sectional length of an opening to the first interior cavity.

13. The vacuum cup of claim 1, wherein the first internal cavity comprises a plurality of ridges.

14. The vacuum cup of claim 13, wherein at least a subset of the plurality of ridges exerts a force on the item when the vacuum seal between the vacuum cup and the item is engaged.

15. The vacuum cup of claim 13, wherein the plurality of ridges is defined by at least one interior wall of the first internal cavity.

16. The vacuum cup of claim 1, further comprising:
   one or more flaps over an opening to the first internal cavity.

17. The vacuum cup of claim 16, wherein the one or more flaps form a set of flexible pinching flaps that allow the least part of the item to enter the first internal cavity when the vacuum seal is engaged, and that impede removal of the least part of the item from the first internal cavity.

18. The vacuum cup of claim 1, further comprising:
   a depth limiter that adjusts a depth of the first internal cavity.

19. The vacuum cup of claim 18, wherein the depth limiter limits a depth to which the at least the part of the item enters the first internal cavity when the vacuum seal is engaged.

20. The vacuum cup of claim 18, wherein the depth limiter limits a depth according to a type of packaging of the item.

21. The vacuum cup of claim 1, wherein in response to the item being engaged and the suction system controlling a pressure within the first internal cavity to create a vacuum seal between the vacuum cup and the item, at least part of the item is caused to enter the first internal cavity at least during engagement of the vacuum seal.

22. An end effector to a robotic arm, the end effector comprising one or more of the vacuum cup of claim 1.

23. A robotic system, comprising:
   a robotic arm that is controlled to move an item from a source location to a destination location, the robotic arm comprising:
      an end effector, the end effector comprising:
         a vacuum cup, comprising:
            one or more walls that define (i) a first internal cavity and (ii) an opening to the first internal cavity, wherein the first internal cavity is defined at least in part by an interior surface adjacent to the opening to the first internal cavity, the interior surface defining an internal ridge positioned to mechanically engage a material drawn into the first internal cavity through the opening at an angle such that the mechanical engagement resists the material being removed from the first internal cavity via the opening;
            a secondary internal cavity, the secondary internal cavity having an opening from the first internal cavity; and
            an interface configured to connect to a suction system that controls a pressure within the first internal cavity, and
   one or more processors coupled to the robotic arm and configured to:
      determine to move the item from the source location to the destination location;
      determine a plan to move the item from the source location to the destination location; and
      control the robotic arm to move the item, comprising:
         causing the robotic arm to engage the item with the vacuum cup; and causing a vacuum seal to be created between the vacuum cup and the item, wherein at least part of the item is within the secondary internal cavity when the vacuum seal is engaged between the vacuum cup and the item.

24. The robotic system of claim 23, wherein the robotic system is a robotic singulation system, a robotic kitting system, or a robotic palletizing system.

25. A vacuum cup, comprising:

one or more walls that define (i) a first internal cavity, (ii) an opening to the first internal cavity, and (iii) a secondary internal cavity having an opening from the first internal cavity, herein the first internal cavity is defined at least in part by an interior surface adjacent to the opening to the first internal cavity, and the interior surface defining an internal ridge positioned to mechanically engage engages a material of an item drawn into the first internal cavity through the opening at an angle such that the mechanical engagement resists the material being removed from the first internal cavity via the opening; and an interface configured to connect to a suction system configured to create a vacuum within the first internal cavity, wherein at least part of the item is within the secondary internal cavity when the vacuum seal is engaged between the vacuum cup and the item.

* * * * *